(12) United States Patent
Imai et al.

(10) Patent No.: US 6,788,019 B2
(45) Date of Patent: Sep. 7, 2004

(54) ELECTRIC DISCHARGE MACHINING DEVICE AND ELECTRIC DISCHARGE MACHINING METHOD

(75) Inventors: Yoshihito Imai, Tokyo (JP); Hidetaka Miyake, Tokyo (JP); Takayuki Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/130,472

(22) PCT Filed: Sep. 19, 2001

(86) PCT No.: PCT/JP01/08146

§ 371 (c)(1),
(2), (4) Date: May 20, 2002

(87) PCT Pub. No.: WO02/24389

PCT Pub. Date: Mar. 28, 2002

(65) Prior Publication Data

US 2003/0080094 A1 May 1, 2003

(30) Foreign Application Priority Data

Sep. 20, 2000 (JP) .............................. 2000-285112

(51) Int. Cl.$^7$ .................... G05B 19/25; G05B 19/33; B23H 1/02; B23H 9/00; B23K 9/00
(52) U.S. Cl. .................... 318/570; 318/579; 219/69.17; 219/69.11
(58) Field of Search .................... 318/570, 579, 318/571, 574; 219/69.16, 69.17, 69.11; 409/293

(56) References Cited

U.S. PATENT DOCUMENTS

| | | | | |
|---|---|---|---|---|
| 5,267,141 A | * | 11/1993 | Morita et al. ............. | 219/69.16 |
| 5,428,201 A | * | 6/1995 | Kaneko et al. .......... | 219/69.16 |
| 5,900,165 A | * | 5/1999 | Taneda .................... | 219/69.16 |
| 5,973,498 A | * | 10/1999 | Imai et al. ................ | 219/69.16 |
| 6,225,589 B1 | * | 5/2001 | Bartok ...................... | 219/69.15 |
| 6,278,075 B1 | * | 8/2001 | Kamiguchi et al. ...... | 219/69.12 |
| 6,385,501 B1 | * | 5/2002 | Imai et al. ................ | 219/69.16 |

FOREIGN PATENT DOCUMENTS

| | | | | |
|---|---|---|---|---|
| JP | 58177236 A | * | 10/1983 | ............. B23P/1/14 |
| JP | 1-234162 | | 9/1989 | |
| JP | 2-53520 | | 2/1990 | |
| JP | 6-8058 | | 1/1994 | |
| JP | 6-55347 | | 3/1994 | |
| JP | 6-143043 | | 5/1994 | |
| JP | 08118149 A | * | 5/1996 | ............. B23H/1/02 |
| JP | 2-714851 | | 2/1998 | |
| JP | 2000-192958 | | 7/2000 | |
| JP | 2000-218442 | | 8/2000 | |
| JP | 2002172525 A | * | 6/2002 | ............. B23H/1/02 |

OTHER PUBLICATIONS

Saito et al. "Discharge Machining Technique", Basics to Future Development, Sep. 1997.

* cited by examiner

Primary Examiner—Shih-Yung Hsieh
Assistant Examiner—Edgardo San Martin
(74) Attorney, Agent, or Firm—Leydig, Voit & Mayer, Ltd.

(57) ABSTRACT

An electric discharge machining apparatus is provided with an electrode mounting section which mounts a tool electrode, and an electrode driving section which has a radial driving section which supports and drives the electrode mounting section in a non-contact manner in a radial direction and a thrust driving section which supports and drives the electrode mounting section in a non-contact manner in a thrust direction, and a machining state is controlled by adjusting a position of the tool electrode by the electrode driving section. Because of such a structure, a mass increase of a section which should be driven together with the electrode is restricted, and high response in X-axis, Y-axis and Z-axis directions are achieved, whereby an electric discharge machining apparatus capable of improving a machining speed and a machining accuracy is achieved.

21 Claims, 18 Drawing Sheets

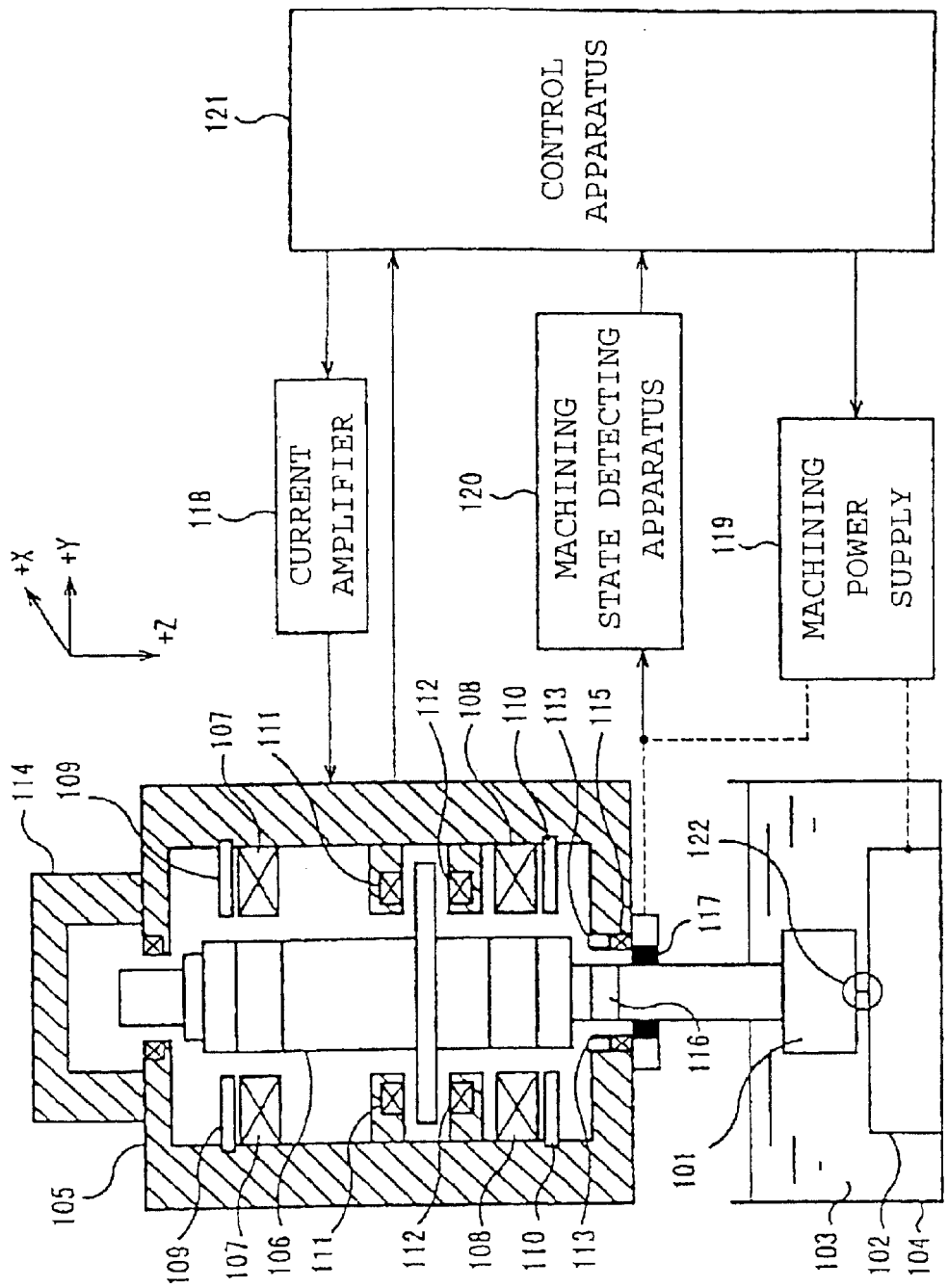

ELECTRIC DISCHARGE MACHINING DEVICE AND ELECTRIC DISCHARGE MACHINING METHOD

TECHNICAL FIELD

The present invention relates to a method of and an apparatus for electric discharge machining in which a voltage is applied between a tool electrode and a workpiece so as to generate an electric discharge and execute machining ("working"). More particularly, this invention relates to a method of and an apparatus for electric discharge machining which can achieve a high speed response in X-axis, Y-axis and Z-axis directions for driving an electrode, and improve machining accuracy.

BACKGROUND ART

In electric discharge machining, a tool electrode and a workpiece are arranged in a machining fluid, a voltage is applied therebetween and an electric discharge is generated so as to erode the workpiece. In an electric discharge machining apparatus, in order to machine a desired shape while maintaining a stable machining state, a driving apparatus which adjusts positions of the tool electrode or the workpiece is provided. FIG. 17 is a schematic view which shows an outline structure of a conventional electric discharge machining apparatus which is described, for example, in pages 63–64 of "Discharge Machining Technique—From Basics to Future Development" issued by Nikkan Kogyo Shinbun, Ltd (1997).

In FIG. 17, reference numeral 101 denotes a tool electrode, reference numeral 102 denotes a workpiece, reference numeral 103 denotes a machining fluid, reference numeral 104 denotes a machining tank, reference numeral 1201 denotes an electrode mounting section which mounts the tool electrode 101, reference numeral 501 denotes a head section which supports the electrode mounting section 1201, reference numeral 502 denotes a head drive section which drives the tool electrode 101, the electrode mounting section 1201 and the head section 501, reference numeral 503 denotes a column section, reference numeral 504 denotes a column driving section which drives the tool electrode 101, the electrode mounting section 1201, the head section 501, the head driving section 502 and the column section 503, reference numeral 505 denotes a saddle section, reference numeral 506 denotes a saddle driving section which drives the tool electrode 101, the electrode mounting section 1201, the head section 501, the head driving section 502, the column section 503, the column driving section 504 and the saddle section 505, and reference numeral 507 denotes a bed section. The head driving section 502, the column driving section 504 and the saddle driving section 506 are, for example, constituted by an AC motor and a ball screw, and respectively constitute a driving section which positions the electrode in Z direction, a driving section which positions in Y direction and a driving section which positions in X direction. Further, reference numeral 119 denotes a machining power supply which supplies a machining energy to the tool electrode 101 and the workpiece 102, reference numeral 120 denotes a machining state detecting apparatus which detects a machining state, reference numeral 1202 denotes a servo amplifier which supplies a drive current to each of the electrode mounting section 1201, the head driving section 502, the column driving section 504 and the saddle driving section 506 so as to execute positioning, and reference numeral 1203 denotes a control apparatus giving a command value to the servo amplifier 1202 and the machining power supply 119. Further, reference numeral 122 denotes an electric discharge machining process progressed between the tool electrode 101 and the workpiece 102.

FIG. 18 shows a gap control system which controls machining state in the electric discharge machining apparatus shown in FIG. 17. In FIG. 18, reference numeral 301 denotes an electric discharge machining process section, reference numeral 302 denotes a machining state detecting section, reference numeral 303 denotes a reference value setting section, reference numeral 304 denotes a machining pass setting section, reference numeral 1301 denotes a machining control section, reference numeral 1302 denotes a XYZ driving control section, reference numeral 1303 denotes a current amplifier section, reference numeral 1304 denotes a XYZ driving section, and reference numeral 1305 denotes a XYZ driving apparatus constituted by the XYZ driving control section 1302, the current amplifier section 1303 and the XYZ driving section 1304. The electric discharge machining process section 301 corresponds to the electric discharge machining process 122, the machining state detecting section 302 corresponds to the machining state detecting apparatus 120, the XYZ driving control section 1302 and the current amplifier section 1303 correspond to the servo amplifier 1202, and the XYZ driving section 1304 corresponds to the head driving section 502, the column driving section 504 and the saddle driving section 506, respectively. Further, the reference value setting section 303, the machining pass setting section 304 and the machining control section 1301 are constructed in the control apparatus 1203. Further, y indicates a state variable of the electric discharge machining process, ym indicates a detected value detected by the machining state detecting section 302, r indicates a reference value set by the reference value setting section 303, e indicates a deviation determined from the reference value r and the detected value ym, Rp indicates a machining pass vector set by the machining pass setting section 304, Up indicates a position command value to the XYZ driving control section 1302, Uc indicates a current command value to the current amplifier section 1303, Ic indicates a current amount supplied to the XYZ driving section 1304, St indicates a position detected value obtained from the XYZ driving section 1304, and Mp indicates an electrode position operating amount operated by the XYZ driving section 1304. The position command value Up to the XYZ driving control section 1302 is determined by the machining control section 1301 on the basis of the deviation e and the machining pass vector Rp. Since the machining pass vector Rp is given by a Cartesian coordinate system (XYZ), the position command value Up is in the same Cartesian coordinate system (XYZ). Further, the position detected value St is the detected value in the X direction, the Y direction and the Z direction. Accordingly, in the XYZ driving control section 1302, the position command value Up and the position detected value St are compared, and the current command value Uc to the current amplifier section 1303 is determined. The current command value Uc is given to each of three current amplifiers for the head driving section 502, the column driving section 504 and the saddle driving section 506. That is, in the conventional gap control system shown in FIG. 18, it is made such as to detect, for example, an average gap voltage by the machining state detecting section 302, and move the tool electrode by the XYZ driving apparatus 1305 so that the detected value coincides with a predetermined reference value, thereby achieving a stable machining state.

However, the machining state irregularly changes, and in order to maintain a stable machining state, a high speed response of the XYZ driving apparatus becomes important. When a stable machining state can not be maintained, a short-circuit state, a continuous arc state or the like is frequently generated, and an effective electric discharging state contributing to the machining is reduced, so that the machining speed is reduced. Further, since the short-circuit state, the continuous arc state or the like is frequently generated, a crack or a pit is formed on the machined surface, or an abnormal wear of a tool electrode is locally generated, so that a reduction of machining surface quality or a deterioration of machining accuracy is caused. When a high speed response of the XYZ driving apparatus can not be expected, since it is intended to maintain a stable machining state by selecting the machining condition in which a gap distance during machining becomes comparatively large, it is hard to achieve the machining at high accuracy.

The Patent Publication of Japanese Patent No. 2714851 "Discharge Machining Control Device" discloses a technology for solving the problems in the high speed response of the tool electrode driving apparatus explained above. It is disclosed in this publication, in order to control a gap between a tool electrode and a workpiece, to constitute a driving system by assembling a plurality of driving mechanisms having different frequency characteristics and moving at least one of the tool electrodes and the workpiece in a coaxial direction. However, this publication does not describe a particular driving mechanism which can achieve a high speed response in all directions of the X direction, the Y direction and the Z direction, and there is not referred to a machining control method or a control apparatus when accompanying with a jump motion or a planetary motion which is used for maintaining the stable machining state.

Further, in the grinding method disclosed in Japanese Patent Application Laid-Open No. H1-234162 (Japanese Application), there is presented a method of executing a cutting motion of a tool to a workpiece at a high speed by providing a magnetic bearing spindle and moving the spindle in a spindle diametrical direction on the basis of a predetermined reference value, in place of a cutting motion of a conventional tool constituted by a motor and a ball screw to the workpiece, in a grinding machine, whereby a machining efficiency and a machining accuracy can be improved. In the electric discharge machining, it is necessary that the tool electrode is driven in the XYZ directions on the basis of the machining pass, and a driving amount is determined on the basis of the electric discharge machining state so that the machining becomes stable. Further, there is such when the driving amount becomes some μm to some tens cm in case of some machinings, and there is such when the machining can not be executed when there is employed the drive amount which can be driven by the magnetic bearing spindle. That is, in accordance with the machining method shown in Japanese Patent Application Laid-Open No. H1-234162 mentioned above, since the structure is not made such as to control the driving direction, it is hard to obtain a good machining result even when being applied to the electric discharge machining.

In the conventional electric discharge machining apparatus, when driving the tool electrode 101 to each of the X-axis, the Y-axis and the Z-axis directions, it is necessary that the head driving section 502 drives the electrode mounting section 1201 and the head section 502 in addition to the tool electrode 101 in the Z-axis direction, the column driving section 504 drives the electrode mounting section 1201, the head section 501, the head driving section 502 and the column section 503 in addition to the tool electrode 101 in the Y-axis direction, and the saddle driving section 506 drives the tool electrode 101, the electrode mounting section 1201, the head section 501, the head driving section 502, the column section 503, the column driving section 504 and the saddle section 505 in the X-axis direction. Accordingly, in order to achieve the response in each of the driving sections, there is a problem that it is necessary to take into consideration an increase of mass of the sections moving in each of the X-axis, the Y-axis and the Z-axis directions together with the tool electrode 101 in addition to the tool electrode 101. The response here becomes a relation response of the head driving section 502>response of the column driving section 504>response of the saddle driving section 506, and the control performance of the machining state is determined on the basis of the response of the saddle driving section 506, so that there is generated an obstacle in view of improving the machining speed and the machining accuracy.

The present invention has been achieved in order to solve the problems as mentioned above. It is an object of this invention is to provide a method of and apparatus for electric discharge machining which can restrict an increase of mass of sections which are required to move in each of X-axis, Y-axis and Z-axis directions together with a tool electrode, which can achieve a high speed response in the X-axis, the Y-axis and the Z-axis directions, and which can improve machining speed and machining accuracy.

DISCLOSURE OF THE INVENTION

According to a first aspect of the present invention, there is provided an electric discharge machining apparatus comprising an electrode mounting unit which mounts a tool electrode, an electrode driving unit which has a radial driving unit which drives the electrode mounting unit in a non-contact manner in a radial direction and a thrust driving unit which drives the electrode mounting unit in a non-contact manner in a thrust direction, a machining state detecting unit which detects an electric discharge machining state, a reference value setting unit which sets a control reference of the electric discharge machining state, a machining pass setting unit which sets a machining pass, and a machining control unit which adjusts a position of the tool electrode by the electrode driving unit while taking into consideration the machining pass set by the machining pass setting unit, so that the detected value detected by the machining state detecting unit coincides with the reference value set by the reference value setting unit. Accordingly, it is possible to restrict a mass increase in the sections which should be driven together with the tool electrode, and to achieve the high speed response in the X-axis, the Y-axis and the Z-axis directions of the electrode driving, it is possible to maintain a stable machining state even when the machining state irregularly changes, and it is possible to obtain an effect of improving the machining speed and the machining accuracy.

A second aspect of the present invention provides an electric discharge machining apparatus comprising an electrode mounting unit which mounts a tool electrode, an electrode driving unit which has a radial driving unit which drives the electrode mounting unit in a non-contact manner in a radial direction and a thrust driving unit which drives the electrode mounting unit in a non-contact manner in a thrust direction, a position adjusting unit which adjusts a position of the electrode driving unit or a workpiece, a machining state detecting unit which detects an electric discharge machining state, a reference value setting unit which sets a control reference of the electric discharge machining state, a machining pass setting unit which sets a machining pass, and a coordination control unit which adjusts a relative position between the tool electrode and the workpiece by coordinating the electrode driving unit with the position adjusting unit while taking into consideration the machining pass set by the machining pass setting unit, so that the detected value detected by the machining state detecting unit coincides with the reference value set by the reference value setting unit. Accordingly, it is possible to achieve the high speed response in the X-axis, the Y-axis and the Z-axis directions of the electrode driving, it is possible to achieve a stable machining state even when the machining state irregularly changes, and it is possible to obtain an effect of improving the machining speed and improving the machining accuracy without being affected by the limitation of the driving stroke of the electrode driving section by adjusting the position of the electrode driving apparatus by the position adjusting apparatus following to the progress of the machining.

A third aspect of the present invention provides the electric discharge machining apparatus according to the second aspect, wherein the coordination control unit has a jump motion control unit which executes a jump motion by the position adjusting unit. Accordingly, it is possible to achieve the high speed response in the X-axis, the Y-axis and the Z-axis directions of the electrode driving. Moreover, it is possible to machine while forcibly discharging any debris staying in the machining gap because of the jump motion so that it is possible to obtain an effect of improving the machining speed and improving the machining accuracy even when the machining depth is increased. Moreover, the machining is not limited by the driving stroke of the electrode driving unit.

A fourth aspect of the present invention provides the electric discharge machining apparatus according to the second aspect, wherein the coordination control unit has a planetary motion control unit which executes a planetary motion by the electrode driving unit. Accordingly, it is possible to maintain a more stable machining with planetary motion on the basis of the high speed response in the X-axis, the Y-axis and the Z-axis directions, and it is possible to obtain an effect of improving the machining speed and the machining accuracy.

A fifth aspect of the present invention provides the electric discharge machining apparatus according to the second aspect, wherein the coordination control unit has a jump motion control unit which executes a jump motion by the position adjusting unit and a planetary motion control unit which executes a planetary motion by the electrode driving unit. Accordingly, it is possible to achieve the high speed response in the X-axis, the Y-axis and the Z-axis directions of the electrode driving. Moreover, it is possible to machine while forcibly discharging any debris staying in the machining gap because of the jump motion so that it is possible to obtain an effect of improving the machining speed and improving the machining accuracy even when the machining depth is increased. Moreover, the machining is not limited by the driving stroke of the electrode driving unit.

A sixth aspect of the present invention provides the electric discharge machining apparatus according to the first aspect and the second aspect, wherein the electrode driving unit has a rotation driving unit which rotates the electrode mounting unit and a rotation detecting unit which detects at least one of an angle of rotation and an angular velocity of rotation, and the machining control unit or the coordination control unit has a rotation control unit. Accordingly, it is possible to achieve the high speed response in the X-axis, the Y-axis and the Z-axis directions of the electrode driving. Moreover, it is possible to machine while forcibly discharging, any debris staying in the machining gap because of the jump motion so that it is possible to obtain an effect of improving the machining speed and improving the machining accuracy even when the machining depth is increased. Moreover, the machining is not limited by the driving stroke of the electrode driving unit.

A seventh aspect of the present invention provides an electric discharge machining method made so as to drive an electrode mounting unit which mounts a tool electrode in a non-contact manner in a radial direction and drive the electrode mounting unit in a non-contact manner in a thrust direction, adjust a position of a driving unit or a workpiece, and adjust a position of the tool electrode with respect to the workpiece while taking into consideration a set machining pass, so that a detected value of an electric discharge machining state coincides with a set reference value of the electric discharge machining state. Accordingly, it is possible to restrict a mass increase in the sections which should be driven together with the tool electrode, and to achieve the high speed response in the X-axis, the Y-axis and the Z-axis directions of the electrode driving, it is possible to maintain a stable machining state even when the machining state irregularly changes, and it is possible to obtain an effect of improving the machining speed and improving the machining accuracy.

An eighth aspect of the present invention provides an electric discharge machining method made so as to, drive an electrode mounting unit which mounts a tool electrode in a non-contact manner in a radial direction and drive the electrode mounting unit in a non-contact manner in a thrust direction, adjust a position of a driving unit or a workpiece, and adjust a position of the tool electrode with respect to the workpiece while taking into consideration a set machining pass, so that a detected value of an electric discharge machining state coincides with a set reference value of the electric discharge machining state by coordinating the driving unit with the adjusting unit. Accordingly, it is possible to achieve the high speed response in the X-axis, the Y-axis and the Z-axis directions of the electrode driving, it is possible to achieve a stable machining state even when the machining state irregularly changes, and to adjust the position of the electrode driving apparatus based on the progress of the machining by the position adjusting apparatus, whereby it is possible to obtain an effect of improving the machining speed and improving the machining accuracy without being affected by the limitation of the driving stroke of the electrode driving section.

A ninth aspect of the present invention provides an electric discharge machining apparatus comprising, an electrode mounting unit which has a through hole which inserts a wire-like electrode therethrough and which has a holding and feeding mechanism of the electrode, an electrode driving unit which has a thrust driving unit which drives the electrode mounting unit at least in a non-contact manner in a thrust direction, a machining state detecting unit which detects an electric discharge machining state, a reference value setting unit which sets a control reference of the electric discharge machining state, a machining control unit which adjusts a position of the tool electrode by the electrode driving unit so that the detected value detected by the machining state detecting unit coincides with the reference value set by the reference value setting unit, and an electrode supply control unit which adjusts holding or feeding of the electrode. Accordingly, it is possible to achieve the high speed response in thrust direction, and it is possible to always maintain a stable machining state even when the machining state irregularly changes.

A tenth aspect of the present invention provides the electric discharge machining apparatus according to the ninth aspect, comprising a tool electrode automatic supplying unit which automatically supplies the wire-like electrode to the through hole provided in the electrode driving unit. Accordingly, in addition to the effects of the ninth aspect, it is possible to continuously and effectively execute a hole machining.

An eleventh aspect of the present invention provides the electric discharge machining apparatus according to the ninth aspect or the tenth aspect, wherein the electrode driving unit is provided with a rotation driving unit which rotates the electrode mounting unit. Accordingly, in addition to the effects of the ninth aspect or the tenth aspect, it is possible to perform stable machining by rotating the electrode when machining the hole.

BRIEF DESCRIPTION OF THE DRAWINGS

FIG. 1 is a cross sectional view which shows a structure of an electric discharge machining apparatus corresponding to a first embodiment of the present invention.

BEST MODE FOR CARRYING OUT THE INVENTION

First Embodiment

Figure 2A:
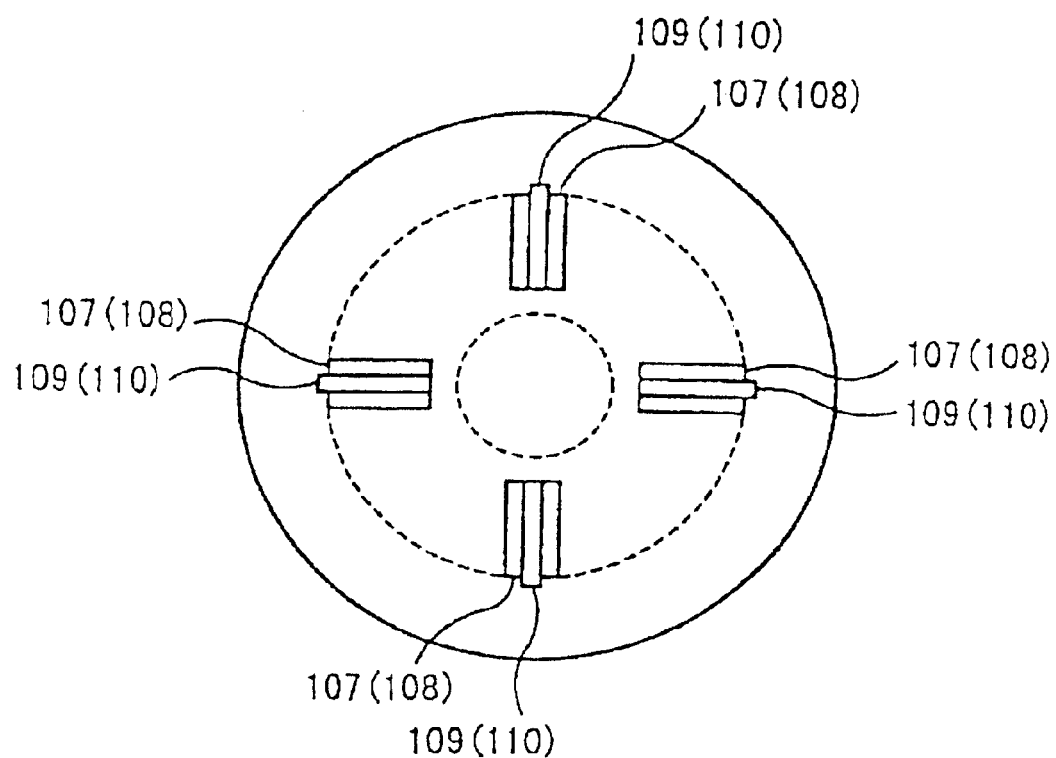
FIG. 2 is a schematic view which shows an arrangement of an electromagnet section of an electrode driving section and a position detecting section in the electric discharge machining apparatus shown in FIG. 1.

FIG. 1 is a schematic view which shows an outline structure of an electric discharge machining apparatus corresponding to a first embodiment of the present invention. In the drawing, reference numeral 101 denotes a tool electrode, reference numeral 102 denotes a workpiece, reference numeral 103 denotes a machining fluid, reference numeral 104 denotes a machining tank, reference numeral 105 denotes an electrode driving section, reference numeral 106 denotes an electrode mounting section which mounts the tool electrode 101, reference numerals 107 and 108 denote a radial electromagnetic section which supports and drives the electrode mounting section 106 in a non-contact manner in a radial direction, reference numerals 109 and 110 denote a radial direction position detecting section which detects a position of the electrode mounting section 106 in a radial direction, reference numerals 111 and 112 denote a thrust electromagnet section which supports and drives the electrode mounting section 106 in a non-contact manner in a thrust direction, reference numeral 113 denotes a thrust direction position detecting section which detects a position of the electrode mounting section 106 in the thrust direction, reference numerals 114 and 115 denote an auxiliary bearing section which auxiliary supports the electrode mounting section 106, reference numeral 116 denotes an insulating section corresponding to a part of the electrode mounting section 106, and reference numeral 117 denotes a power supply section which supplies a machining current to the tool electrode 101. Further, reference numeral 118 denotes a current amplifier which supplies current to the electromagnetic section of the electrode driving section 105, reference numeral 119 denotes a machining power supply supplying a machining energy to the tool electrode 101 and the workpiece 102, reference numeral 120 denotes a machining state detecting apparatus which detects a machining state, and reference numeral 121 denotes a control apparatus which gives a command value to the current amplifier 118 and the machining power supply 119. Further, reference numeral 122 denotes an electric discharge machining process progressed between the tool electrode 101 and the workpiece 102.

FIG. 2(A) is a schematic view which shows an arrangement of the radial electromagnet sections 107 and 108 and the radial direction position detecting sections 109 and 110 in the electrode driving section 105. As shown in FIG. 1 and FIG. 2(A), four radial electromagnetic sections 107 support the electrode mounting section 106 in a radial direction from an upper side in a non-contact manner and drive the electrode mounting section 106. Moreover, four radial electromagnet sections 108 support the electrode mounting section 106 in a radial direction from a lower side in a non-contact manner and drive the electrode mounting section 106.

Figure 2B:
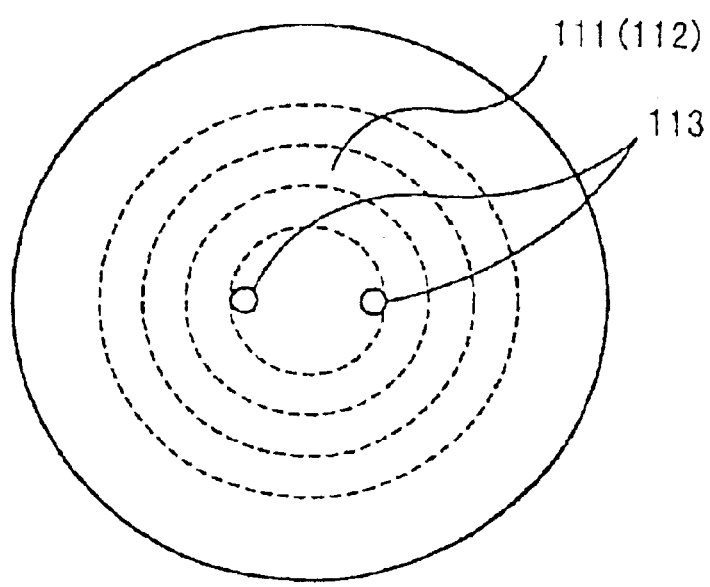

Further, corresponding to each of the radial electromagnet sections, four radial direction position detecting sections 109 are arranged on the upper side and four radial direction position detecting sections 110 are arranged on the lower side. FIG. 2(B) is a schematic view which shows an arrangement of the thrust electromagnet sections 111 and 112 which support and drive the electrode mounting section 106 in a non-contact manner in a thrust direction, and the thrust direction position detecting section 113 which detects the position in the thrust direction. As shown in FIG. 1 and FIG. 2(B), two thrust electromagnetic sections 111 and 112 support and drive the electrode mounting section 106 in a non-contact manner in a thrust direction. Further, two thrust direction position detecting sections 113 are arranged. As mentioned above, a radial driving section which drives the tool electrode in the radial direction is constituted by the radial electromagnet sections 107 and 108 and the radial direction position detecting sections 109 and 110, and a thrust driving section which drives the tool electrode in the thrust direction is constituted by the thrust electromagnet sections 111 and 112 and the thrust direction position detecting section 113. It is possible to support the electrode mounting section 106 in a non-contact manner by the above structure, and it is possible to finely drive the tool electrode 101 in the XYZ-axes directions.

Figure 3:
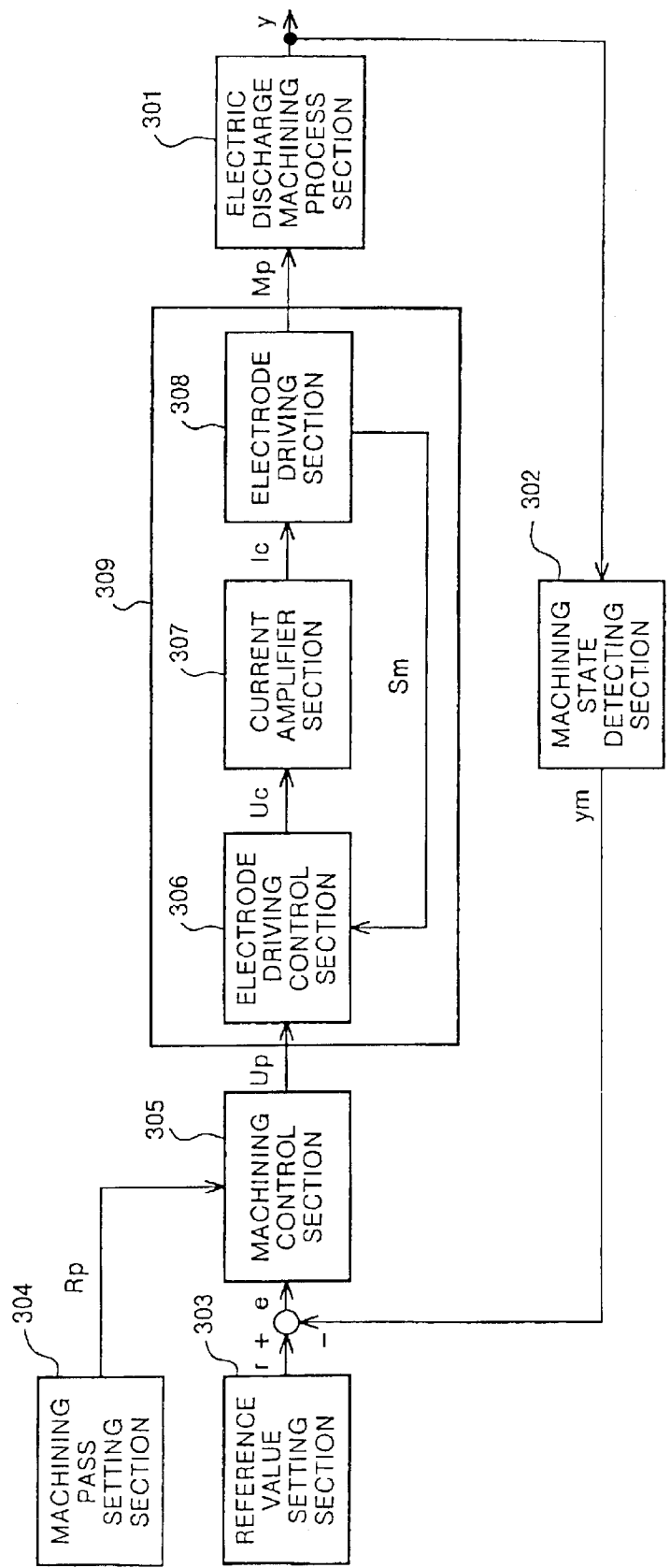
FIG. 3 is a block diagram which shows a system for controlling a gap between a tool electrode and a workpiece in the electric discharge machining apparatus shown in FIG. 1.

FIG. 3 is a block diagram of a system for controlling a gap between a tool electrode and a workpiece which control the electric discharge machining state of the electric discharge machining apparatus shown in FIG. 1. In FIG. 3, reference numeral 301 denotes an electric discharge machining process section, reference numeral 302 denotes a machining state detecting section, reference numeral 303 denotes a reference value setting section, reference numeral 304 denotes a machining pass setting section, reference numeral 305 denotes a machining control section, and reference numeral 306 denotes an electrode driving control section. Reference numeral 307 denotes a current amplifier section, reference numeral 308 denotes an electrode driving section, and reference numeral 309 denotes an electrode driving apparatus section constituted by the electrode driving control section 306, the current amplifier section 307 and the electrode driving section 308. The electric discharge machining process section 301 corresponds to the electric discharge machining process 122, the machining state detecting section 302 corresponds to the machining state detecting apparatus 120, the current amplifier section 307 correspond to the current amplifier 118, and the electrode driving section 308 corresponds to the electrode driving section 105, respectively.

Further, the reference value setting section 303, the machining pass setting section 304, the machining control section 305 and the electrode driving control section 306 are constructed in the control apparatus 121. Further, y indicates a state variable of the electric discharge machining process, ym indicates a detected value detected by the machining state detecting section 302, r indicates a reference value set by the reference value setting section 303, e indicates a deviation determined from the reference value r and the detected value ym, Rp indicates a machining pass vector set by the machining pass setting section, Up indicates a command value to the electrode driving control section 306, Uc indicates a current command value to the current amplifier section 307, Ic indicates a current amount supplied to the electrode driving section 308, Sm indicates a position detected value obtained from the electrode driving section 308, and Mp indicates an electrode position operating amount operated by the electrode driving section 308.

The position command value Up to the electrode driving control section 306 is determined by the machining control section 305 on the basis of the deviation e and the machining pass vector Rp. Since the machining pass vector Rp is given by a Cartesian coordinate system (XYZ), the position command value Up is in the same Cartesian coordinate system (XYZ). On the contrary, the position detected value Sm is the detected value in the radial direction and the thrust direction. Further, in the electrode driving section 308, as shown in FIG. 1 and FIG. 2, four radial electromagnets are arranged in the upper section, and four radial electromagnets in the lower section and two thrust electromagnets are arranged, thereby driving the tool electrode. Accordingly, in the electrode driving control section 306, the position command values Up corresponding to the radial direction and the thrust direction and for which coordinate conversion is not executed are determined, the determined values are compared with the position detected value Sm, and the current command value Uc to be output to the current amplifier 307 is determined based on the result of the comparison. The current command value Uc is given to eight current amplifiers in the radial electromagnet section 107 and 108, and two current amplifiers in the thrust electromagnet sections 111 and 112.

Figure 4:
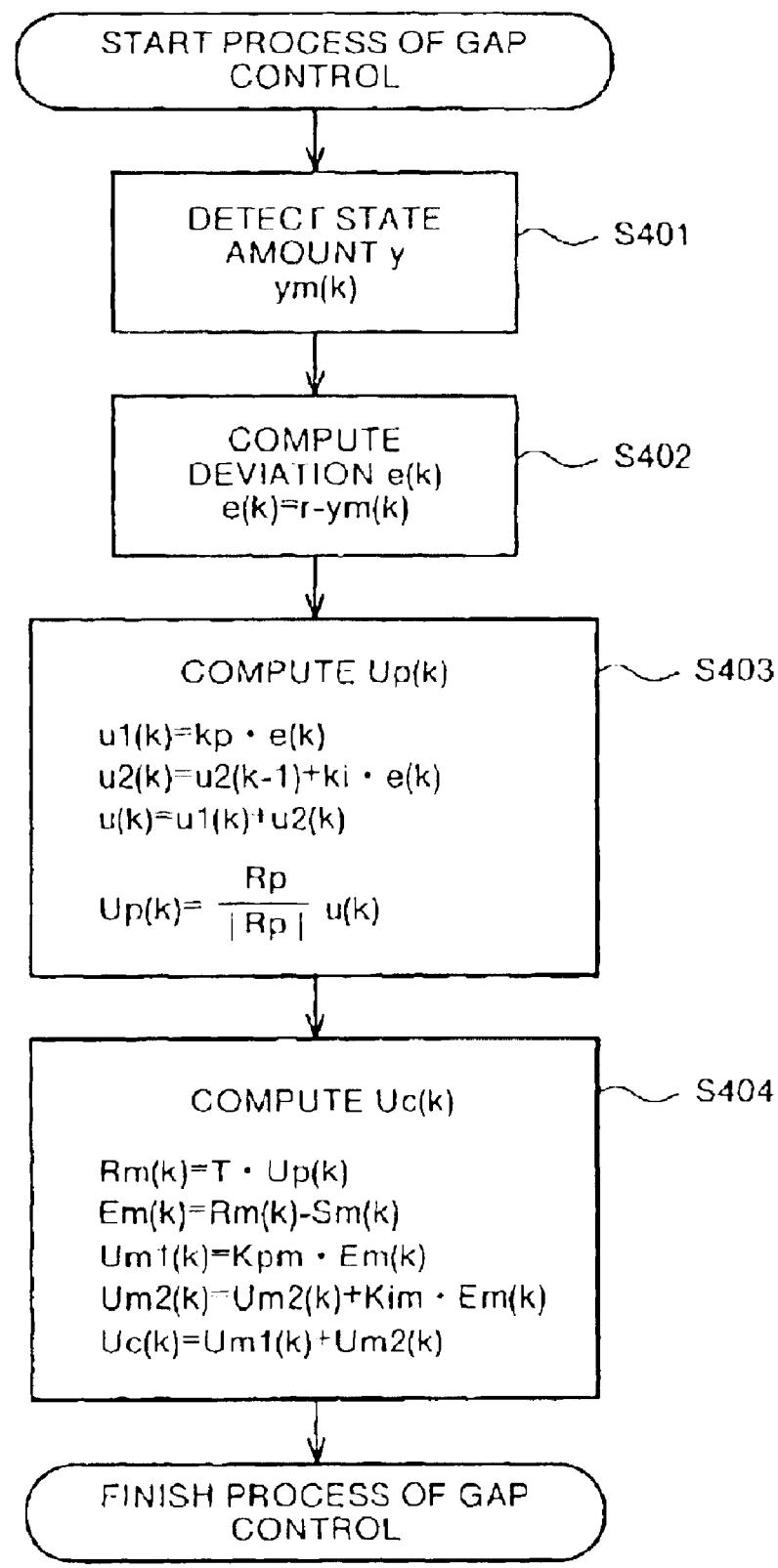
FIG. 4 is a flow chart which shows an operation content of the system shown in FIG. 3

FIG. 4 is a diagram which shows an operation content of the system shown in FIG. 3. The gap control between the electrode and a workpiece is generally achieved by a software process applied by a microcomputer, and FIG. 4 shows k th process. S401 corresponds to a process in the machining state detecting section 302 in FIG. 3, and the state variable y of the electric discharge machining process is detected, for example, as an average gap voltage ym(k). Next, in step S402, a deviation e(k) is determined from the average gap voltage ym(k) and the reference value r. That is, S402 corresponds to a process of determining the deviation from the outputs of the machining state detecting section 302 and the reference value setting section 303 shown in FIG. 3. Next, in step S403, a proportional+integral compensation is applied to the deviation e(k), and a command value Up(k) is determined on the basis of an amount obtained by the compensation and the machining pass vector Rp. Here, kp corresponds to a proportional gain, ki corresponds to an integral gain, Up(k) corresponds to respective command values in the XYZ-axes directions, and Up(k) is given by the Cartesian coordinate system.

In step S404, the coordinate is converted from Up(k) into the radial direction and the thrust direction, and respective reference values Rm(k) in the radial direction and the thrust direction are determined. Next, a deviation Em(k) is determined on the basis of the reference value Rm(k), and detected values Sm(k) from the radial direction position detecting sections 109 and 110 and the thrust direction position detecting section 113. Further, proportional+ integral compensation is applied to the deviation Em(k), and a command value Uc(k) to the current amplifier 307 is determined. Here, T is a coordinate conversion matrix, Kpm is a proportional gain, kim is an integral gain, and a calculation in step S404 is described in a form of matrix calculation. The process in step S404 is executed in the electrode driving control section 306 in FIG. 3.

As mentioned above, in the electric discharge machining apparatus corresponding to the first embodiment of the present invention, in accordance with the electrode driving section 105, since the structure is made such as to drive only the electrode mounting section 106 mounting the tool electrode 101 thereto in the non-contact manner in the radial direction and the thrust direction by the radial electromagnet sections 107 and 108 and the thrust electromagnet sections 111 and 112, it is possible to restrict a mass increase of a section which is required to be driven together with the tool electrode 101.

Further, in the system for controlling a gap between the tool electrode and the workpiece, since the structure is made such as to detect the average gap voltage ym(k) by the machining state detecting section 302, determine the command value Up(k) in the XYZ coordinate system by which the tool electrode 101 should be driven on the basis of the detected value ym(k), the reference value r and the machining pass vector Rp, determine the reference value Rm(k) to the radial driving section and the thrust driving section in the electrode driving section 105, by executing coordinate conversion to the command value Up(k), and move the tool electrode 101 in the radial direction and the thrust direction by the electrode driving section 105 in accordance with the reference value Rm(k), it is possible to coincide the detected value ym(k) with the reference value r at the same time of moving the tool electrode 101 in the XYZ directions by the electrode driving section 105 in accordance with the machining pass vector Rp, thereby achieving a stable machining state. Accordingly, it is possible to achieve the high speed response in the X-axis, Y-axis and Z-axis directions, and it is possible to always maintain the stable machining state even when the machining state irregularly changes. Therefore, it is possible to achieve an improvement of the machining speed, and further an improvement of the machining accuracy.

In the above, the electromagnet is used in the radial driving section and the thrust driving section in the electrode driving section 105. However, the electrode driving section 105 may be structured such that the thrust driving section also includes a permanent magnet to cancel weights of the tool electrode 101 and the electrode mounting section 106, and thus the electrode driving section 105 includes both the electromagnet and the permanent magnet. As a result, it is possible to achieve the same effects as that mentioned above.

Further, the instance in which the system for controlling a gap between a tool electrode and a workpiece is structured by detecting the machining state by the average gap voltage is described, however, the system may be structured by detecting the machining state by a ignition delay time of an electric discharge pulse, and it is possible to achieve the same operational effects as mentioned above.

Further, it is explained above that both the proportional and the integral compensation are executed. However, a feed back control including proportional compensation, proportional, integral, and differential compensation and the like may be employed. On the other hand, a feed forward control system or the like may be employed. Same effects can be achieved by employing any of these control systems.

Second Embodiment

Figure 5:
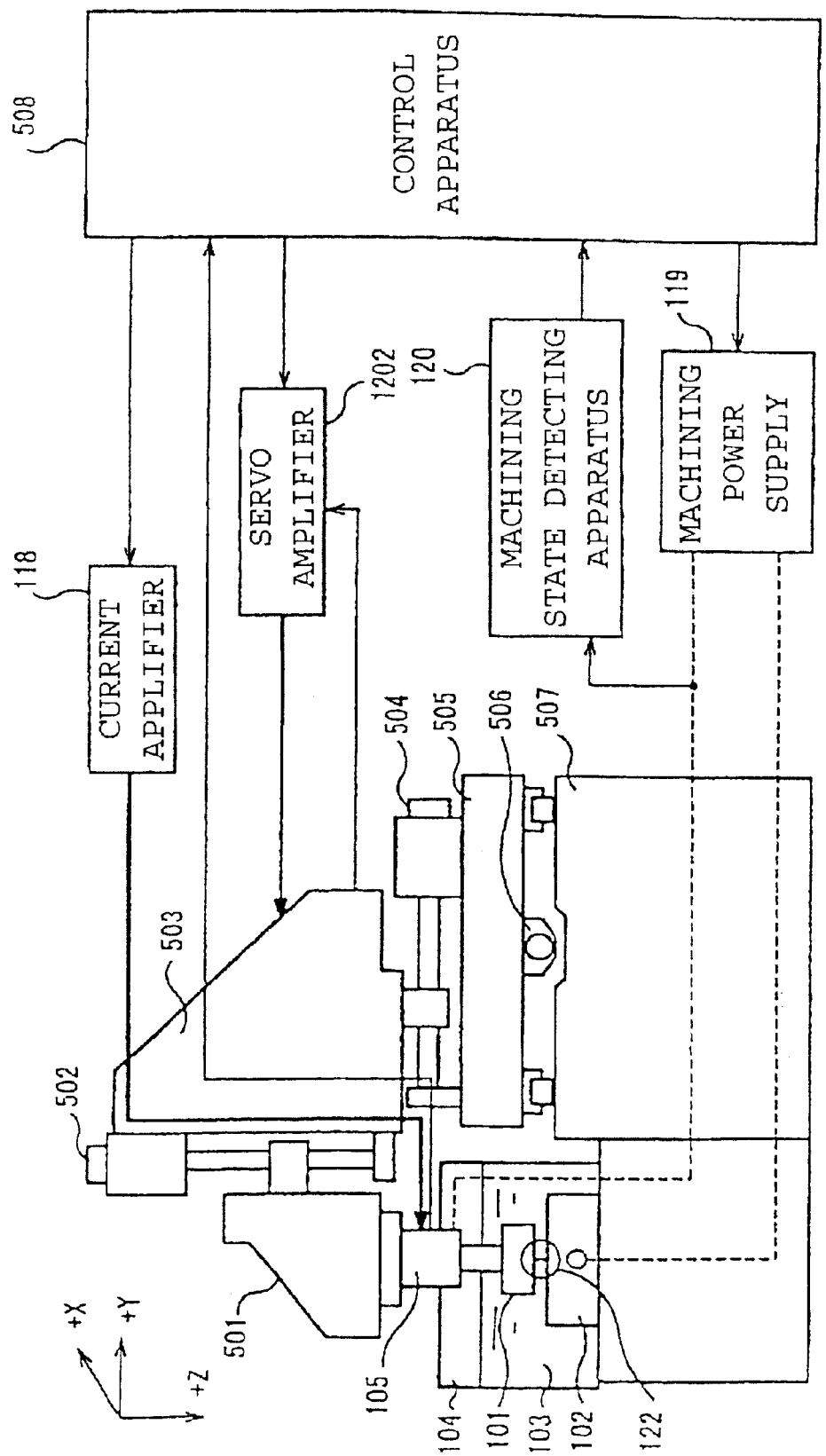
FIG. 5 is a schematic view which shows a structure of an electric discharge machining apparatus corresponding to a second embodiment of the present invention.

FIG. 5 is a schematic view which shows an electric discharge machining apparatus corresponding to a second embodiment of the present invention. In FIG. 5, reference numerals 101 to 104, 501 to 507 and 1202 are the same as the structures shown in the conventional art. Further, reference numerals 118, 119 and 120 are the same as the structures in the first embodiment. Further, reference numeral 508 denotes a control apparatus giving a command value to an current amplifier 118 which supplies current to the servo amplifier 1202 and the electromagnet section of the electrode driving section 105, and the machining power supply 119. In FIG. 5, the position adjusting section constituted by the head section 501, the head driving section 502, the column section 503, the column driving section 504, the saddle section 505 and the saddle driving section 506 adjusts the position of the electrode driving section 105. The electrode driving section 105 is mounted to the head section 501, the head section 501 is driven in the Z-axis direction by the head driving section 502, the head driving section 502 is mounted to the column section 503, the column section 503 is driven in the Y-axis direction by the column driving section 504, the column driving section 504 is mounted to the saddle section 505, and the saddle section 505 is driven in the X-axis direction by the saddle driving section 506.

A driving stroke of the electrode driving section 105 is between several hundred $\mu$m to 1 mm. When the driving stroke is insufficient for the machining, it is possible to expand a substantial driving stroke by harmoniously operating the electrode driving section 105 and the position adjusting section constituted by the head driving section 502, the column driving section 504 and the saddle driving section 506 so as to adjust the relative position between the tool electrode 101 and the workpiece 102.

Figure 6:
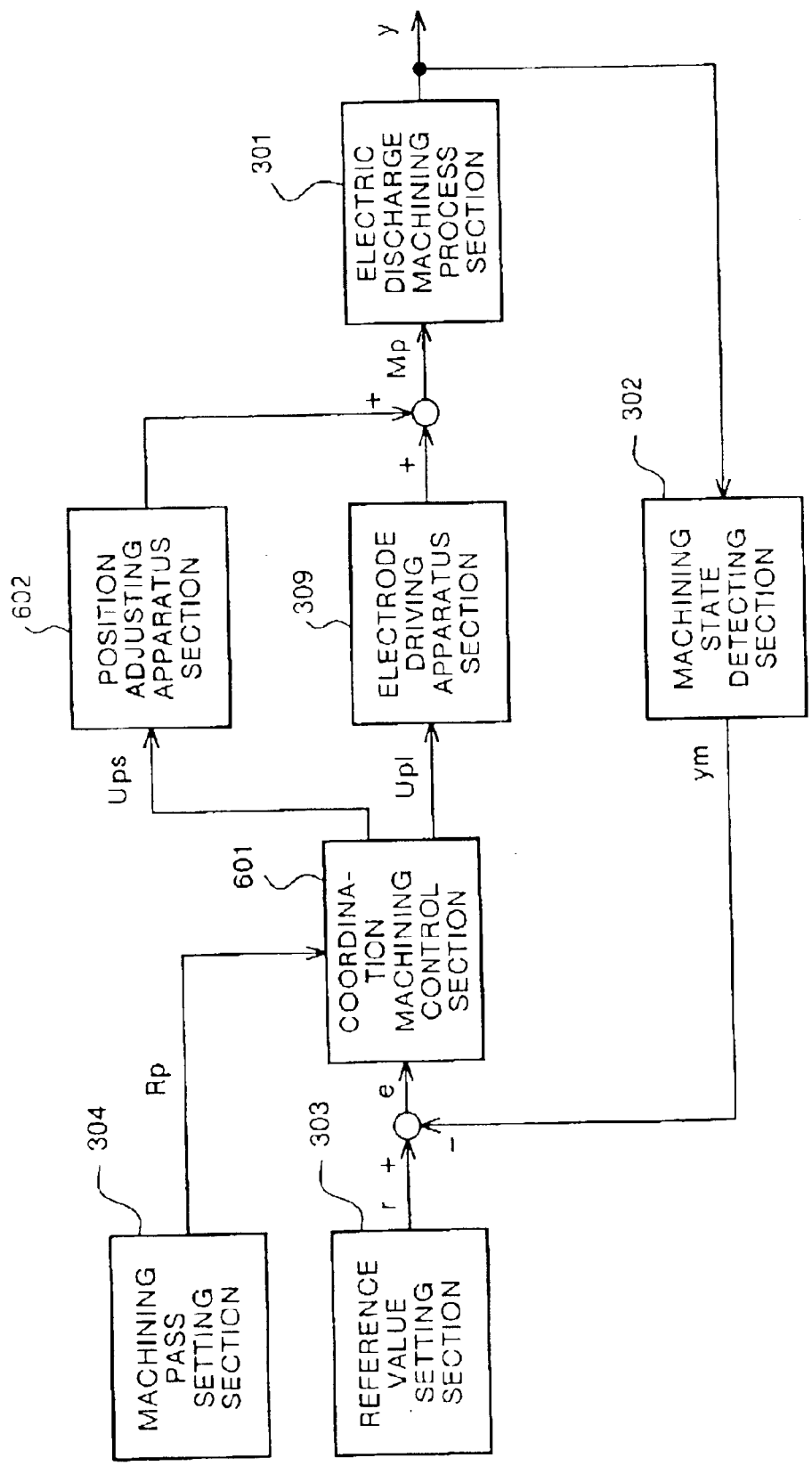
FIG. 6 is a block diagram which shows a system for controlling a gap between a tool electrode and a workpiece in the electric discharge machining apparatus shown in FIG. 5.

FIG. 6 is a block diagram of a system for controlling a gap between a tool electrode and a workpiece which control an electric discharge machining state in the electric discharge machining apparatus corresponding to the second embodiment of the present invention. In FIG. 6, the same reference numerals as those in FIG. 3 denote the corresponding elements, and a description thereof will be omitted. Reference numeral 601 denotes a coordination machining control section, and reference numeral 602 denotes a position adjusting apparatus section, which corresponds to the conventional XYZ driving apparatus section. Upl indicates a command value to the electrode driving apparatus section 309, Ups indicates a command value to the position adjusting apparatus section 602, and Mp indicates an electrode operating amount operated by the electrode driving apparatus section 309 and the position adjusting apparatus section 602. The command value Upl to the electrode driving section 309 and the command value Ups to the position adjusting apparatus section 602 are determined by the coordination machining control section 601 on the basis of the deviation e and the machining pass vector Rp.

That is, in this system of the electric discharge machining apparatus corresponding to the first embodiment, the machining process is controlled by adjusting the position of the tool electrode 101 by the electrode driving apparatus section 309 on the basis of the command value Up determined by the machining control section 305, on the contrary, in the gap control system in the electric discharge machining apparatus corresponding to the second embodiment, the machining process is controlled by adjusting the position of the tool electrode 101 by the electrode driving apparatus section 309 and the position adjusting apparatus section 602 on the basis of the command values Upl and Ups determined by the coordination machining control section 601. The position adjusting apparatus section 602 can easily achieve a driving stroke equal to or more than some hundreds mm, for example, by being structured by an AC motor and a ball screw or a linear motor. Accordingly, even in a situation that requires machining exceeding the driving stroke of the tool electrode 101 driven by the electrode driving apparatus section 309, it is possible to expand the driving stroke of the tool electrode 101 by adjusting the relative position between the electrode 101 and the workpiece 102 by the position adjusting apparatus section 602.

Figure 7:
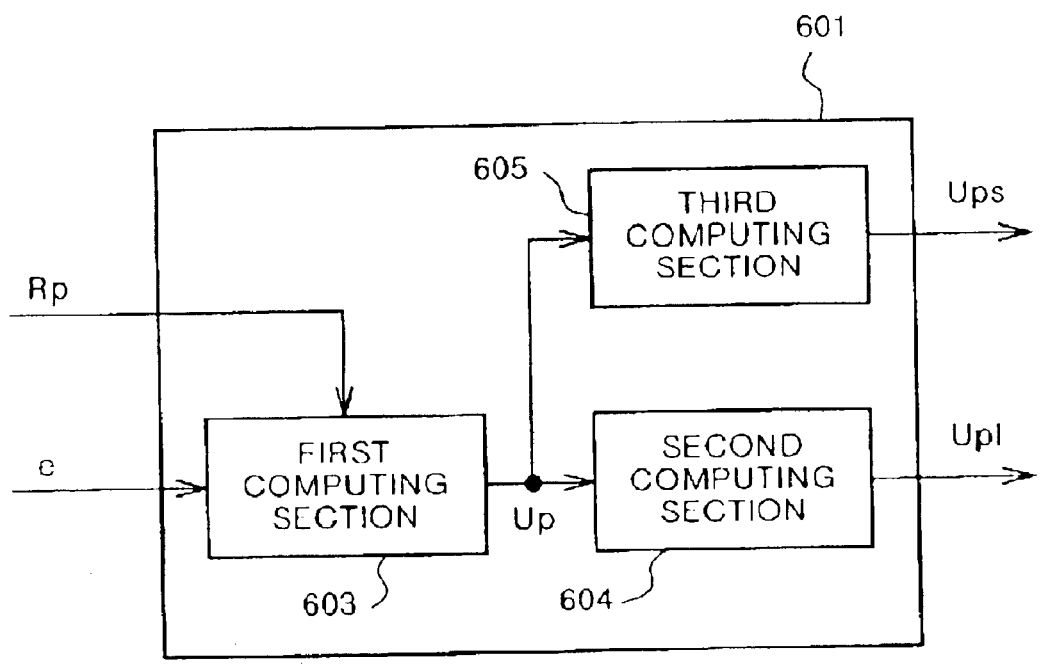
FIG. 7 is a block diagram of the system for controlling a gap between a tool electrode and a workpiece shown in FIG. 6 in detail.

FIG. 7 is a block diagram which shows the coordination machining control section 601 in detail. In the drawing, reference numeral 603 denotes a first computing section, reference numeral 604 denotes a second computing section, and reference numeral 605 denotes a third computing section. In the first computing section 603, in order to control the machining process by the electrode driving apparatus section 309 and the position adjusting apparatus section 602, the command value Up in the XYZ coordinate system by which the tool electrode 101 should be driven is determined on the basis of the deviation e determined from the reference value r and the detected value ym and the machining pass vector Rp. In the second computing section 604, the command value Upl to the electrode driving apparatus section 609 is determined on the basis of the command value Up. Further, in the third computing section 605, the command value Ups to the position adjusting apparatus section 602 is determined on the basis of the command value Up. The processes in the first computing section 603, the second computing section 604 and the third computing section 605 will be explained in detail below.

Figure 8:
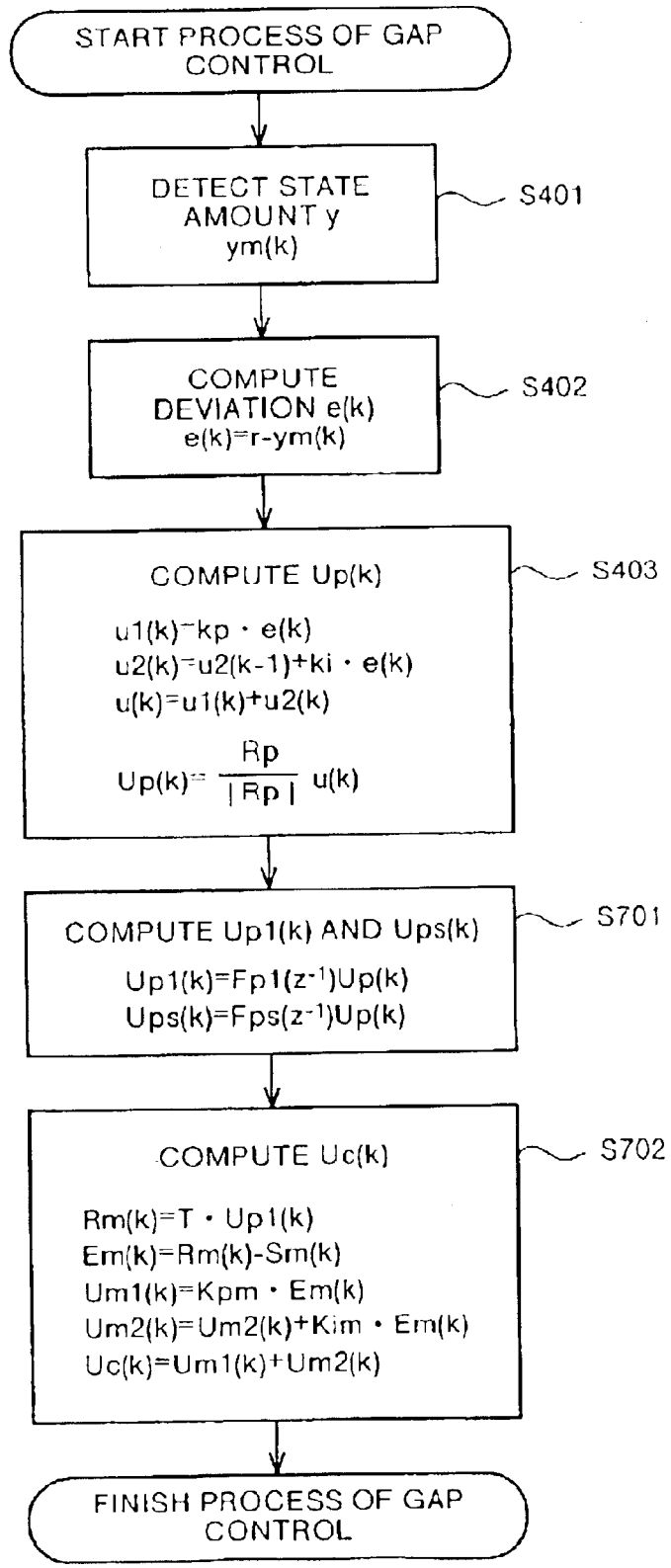
FIG. 8 is a flow chart which shows an operation content of the system shown in FIG. 5.

FIG. 8 shows an operation content of the gap control system shown in FIG. 6. The gap control is generally achieved by the software process applied by the microcomputer, and FIG. 8 shows k th lime process. In FIG. 8, S401 to S403 are the same as those shown in the first embodiment. S401 corresponds to a process in the machining state detecting section 302 in FIG. 6, and the state variable y of the electric discharge machining process is detected, for example, as an average gap voltage ym(k). Next, in step S402, a deviation e is determined from the average gap voltage ym(k) and the reference value r. S403 corresponds to a process in the first computing section 603 in FIG. 7. That is, a proportional+integral compensation is applied to the deviation e(k), and a command value Up(k) is determined on the basis of an amount obtained by the compensation and the machining pass vector Rp. Here, kp corresponds to a proportional gain, ki corresponds to an integral gain, Up(k) corresponds to respective command values in the XYZ-axes directions, and Up(k) is given by the Cartesian coordinate system (XYZ). S701 corresponds to a process in the second computing section 604 and the third computing section 605 in FIG. 7. That is, a process of filtering Up(k) by a digital filter Fpl($z^{-1}$) so as to determine the command value Upl(k) is executed by the second computing section 604. Further, a process of filtering Up(k) by a digital filter Fps($z^{-1}$) so as to determine a command value Ups(k) is executed by the third computing section 605. Characteristics of the digital filter Fps($z^{-1}$) and the digital filter Fpl($z^{-1}$) are determined so that the position adjusting apparatus can compensate the progress of the machining while the electrode driving apparatus stably controls the machining state. For example, the digital filter Fpl($z^{-1}$) is set to a high pass filter characteristic in which a cutoff frequency is about some Hz, or to a band pass filter characteristic in which a pass band is approximately between some Hz to some hundreds Hz, and the digital filter Fps($z^{-1}$) is set to a low pass filter characteristic in which a cutoff frequency is about some Hz. Here, Upl(k) and Ups(k) arc constituted by the respective command value in the XYZ-axes directions. S403 and S701 mentioned above correspond to the process in the coordination machining control section 601 in FIG. 6. S702 corresponds to a process in the electrode driving apparatus section 309 in FIG. 6, and more strictly a process in the electrode driving control section 306 in FIG. 3. That is, in step S702, the coordinate is converted from Upl(k) into the radial direction and the thrust direction, and respective reference values Rm(k) in the radial direction and the thrust direction are determined. Next, a deviation Em(k) is determined on the basis of the reference value Rm(k), and detected values Sm(k) from the radial direction and thrust direction position detecting section. Further, proportional+integral compensation is applied to the deviation Em(k), and a command value Uc(k) to the current amplifier is determined. Here, T is a coordinate conversion matrix, Kpm is a proportional gain, kim is an integral gain, and a calculation in step S702 is described in a form of matrix calculation. The software process mentioned above is achieved in the control apparatus 508 in FIG. 5.

As mentioned above, the electric discharge machining apparatus corresponding to the second embodiment of the present invention includes the coordination machining control section 601 which controls the machining process by coordinating the electrode driving apparatus section 309 and the position adjusting apparatus section 602 to adjust the position of the tool electrode 101. As a result, it is possible to achieve a more stable machining state by the electrode driving apparatus section 309 and it is simultaneously possible to adjust the position of the electrode driving apparatus in correspondence to the progress of the machining by the position adjusting apparatus section 602, so that it is possible to achieve an improvement of the machining speed, and further an improvement of the machining accuracy without being limited by the driving stroke of the electrode driving section.

In the above, the structure is made such that the electrode driving section 105 is driven in the XYZ-axes directions by the position adjusting section constituted by the head driving section 502, the column driving section 504 and the saddle driving section 506, however, the structure may be made such that the workpiece 102 is driven in XY directions by a XY table in place of the column driving section 504 and the saddle driving section 506, and the electrode driving section 105 is mounted to the head section 501 and is driven in a Z-axis direction by the head driving section 502.

Further, in the above, the instance in which the software process of the gap control is processed by one microcomputer is explained, however, the gap control may be achieved by executing, for example, the process in step S702 in the electrode driving apparatus section 309 by using another microcomputer in which it is possible to obtain the same operational effects as mentioned above.

Further, in the above the instance in which the gap control system is structured by detecting the machining state by the average gap voltage is explained, however, the gap control system may be structured by detecting the machining state by an ignition delay time of an electric discharge pulse.

Further, in the above, the instance in which the proportional+integral compensation is, executed is explained, however, a feed back control system such as a proporational compensation, a proportional+integral+ differental compensation and the like, or a feed forward control system or the like may be structured.

Third Embodiment

Figure 9:
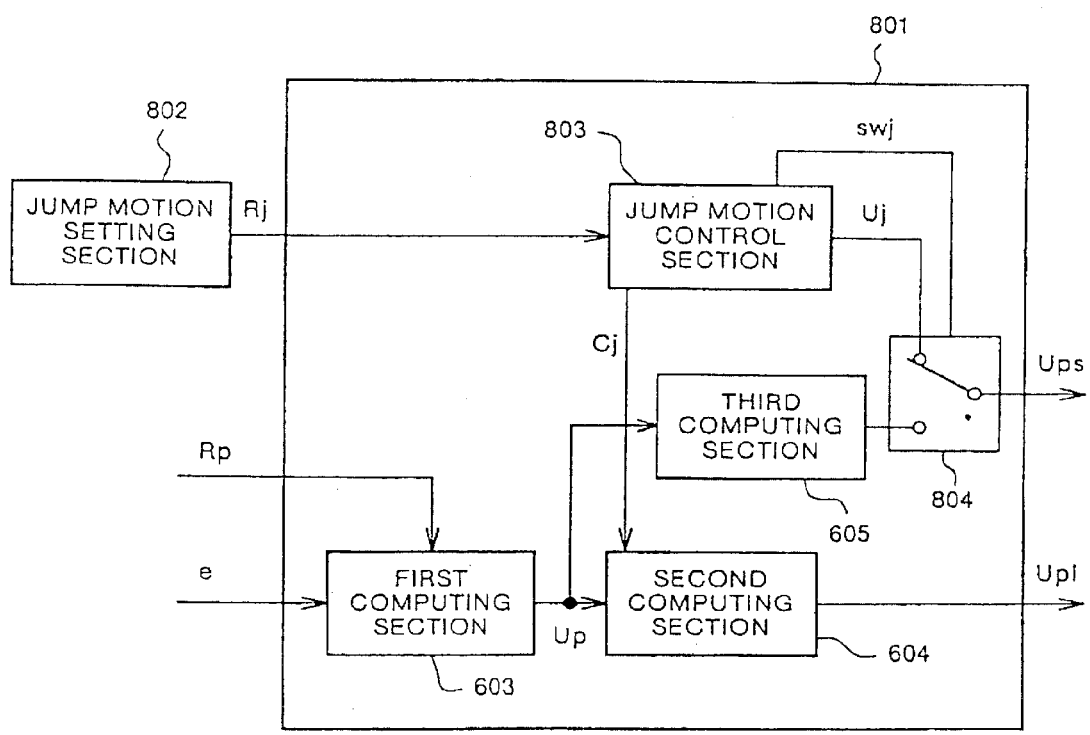
FIG. 9 is a block diagram which shows a part of a system for controlling a gap between a tool electrode and a workpiece in an electric discharge machining apparatus corresponding to a third embodiment of the present invention.

FIG. 9 is a block diagram of a part of a gap control system which controls machining state in an electric discharge machining apparatus corresponding to a third embodiment of the present invention, that is, a coordination machining control section which is different from that shown in the second embodiment. In FIG. 9, functions of e, Rp, 603 to 605, Upl and Ups are the same as the structures shown in the second embodiment. Reference numeral 801 denotes a coordination machining control section, reference numeral 802 denotes a jump motion setting section, reference numeral 803 denotes a jump motion control section, and reference numeral 804 denotes a mode switching section which switches between a jump motion mode and a machining servo mode.

Rj corresponds to a jump motion set value such as a jump up distance, a jump down time, a jump speed and the like which are set by the jump motion setting section 802, Uj corresponds to a jump motion command value which is generated by the jump motion control section 803 on the basis of the jump motion set value Rj, swj corresponds to a signal applied to the mode switching section 804 which switches between the jump mode and the machining servo mode, and cj corresponds to a signal applied to the second computing section 604 which keeps the command value Upl to the electrode driving apparatus constant during the jump motion mode. That is, the jump motion is executed by the position adjusting apparatus section 602, and the machining control at the machining servo mode is executed by the coordinating driving apparatus section 309 and the position adjusting apparatus section 602 in a harmonious manner.

As mentioned above, in accordance with the electric discharge machining apparatus corresponding to the third embodiment of the present invention, since there are provided the jump motion control section 803, the coordination machining control section 801 having the mode switching section 804 which switches between the jump motion and the machining servo, and the jump motion setting section 802 in addition to the first computing section 603, the second computing section 604 and the third computing section 605 which constitute the electric discharge machining apparatus corresponding to the second embodiment, the electrode driving apparatus section 309 and the position adjusting apparatus section 602 harmoniously execute the machining control in the same manner as that of the electric discharge machining apparatus corresponding to the second embodiment at the machining servo mode, and the position adjusting apparatus section 602 executes the jump motion based on the jump motion set value Rj set by the jump motion setting section 802 at the jump motion mode. Accordingly, it is possible to achieve a stable machining state with the electrode driving apparatus section 309 capable of responding at high speed and to adjust the position of the electrode driving apparatus in correspondence to the progress of the machining by the position adjusting apparatus section 602. As a result, it is possible to improve the machining speed, and further the machining accuracy without being limited by the driving stroke of the electrode driving section. Further, it is possible to machine without being limited by the driving stroke of the electrode driving apparatus section 309 and forcibly discharging the debris staying in the machining gap with the jump motion by the position adjusting apparatus section 602. As a result, it is possible to improve the machining speed and the machining accuracy even when the machining depth is deep.

Forth Embodiment

Figure 10:
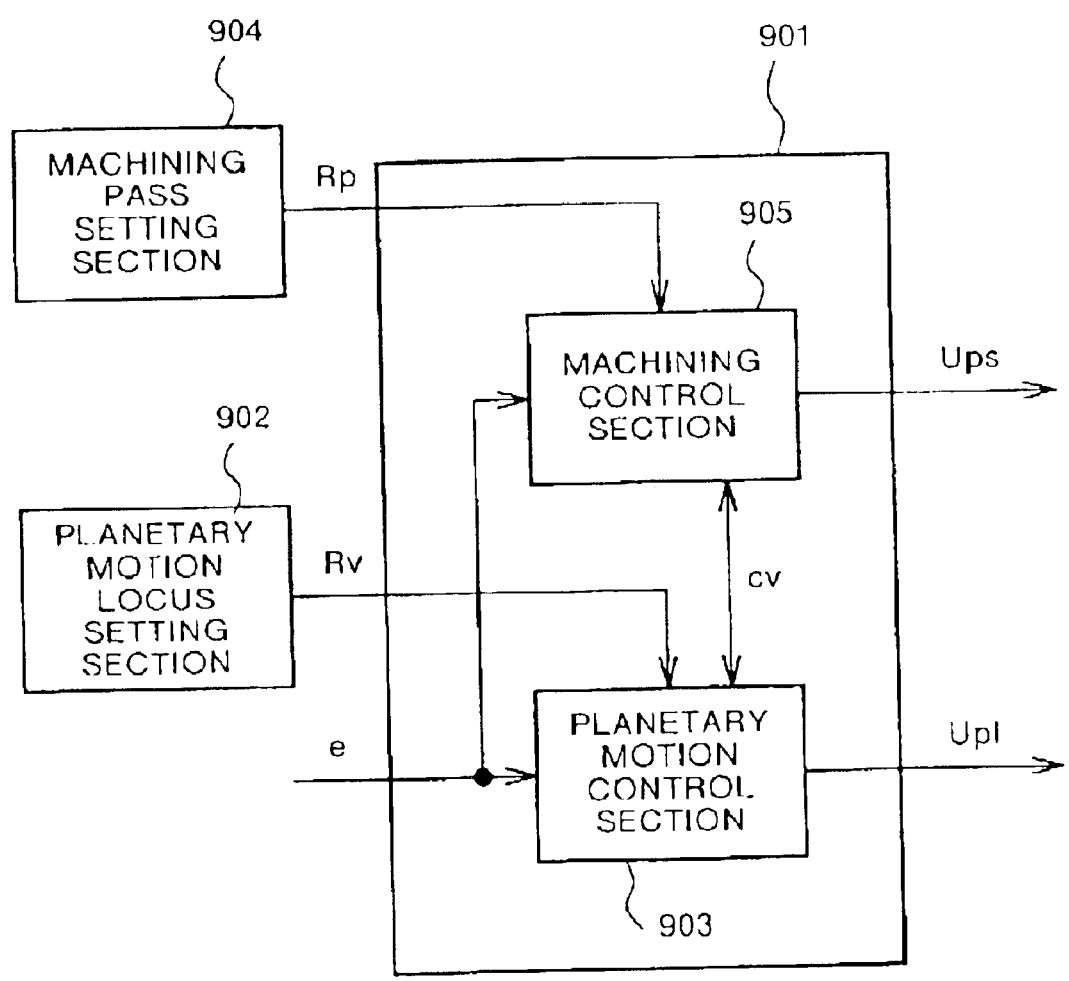
FIG. 10 is a block diagram which shows a part of a system for controlling a gap between tool electrode and a workpiece in an electric discharge machining apparatus corresponding to a forth embodiment of the present invention.

FIG. 10 is a block diagram of a part of a gap control system which controls machining state in an electric discharge machining apparatus corresponding to a forth embodiment of the present invention, that is, a coordination machining control section which is different from that shown in the second embodiment. In FIG. 10, meanings of e, Upl and Ups are the same as those shown in the second embodiment. Reference numeral 901 denotes a coordination machining control section, reference numeral 902 denotes a planetary motion locus setting section, reference numeral 903 denotes a planetary motion control section, reference numeral 904 denotes a machining pass setting section, and reference numeral 905 denotes a machining control section.

Rv corresponds to a planetary motion locus vector set in the planetary motion locus setting section 902, Rp corresponds to a machining pass vector set in the machining pass setting section 904, and cv corresponds to a signal for synchronizing the planetary motion locus with the machining pass. In the planetary motion machining, the tool electrode 101 is moved in an expanded manner so as to form a circular shape, a square shape or the like on a two-dimensional plane at a magnitude between some $\mu$m and some hundreds $\mu$m in synchronous with a predetermined depth, or moved in an expanded manner on a three-dimensional curved surface at a predetermined position. The planetary motion locus vector Rv constituted by the expanded motion between some $\mu$m and some hundreds $\mu$m is set in the planetary motion locus setting section 902, and the machining pass vector Rp is set in the machining pass setting section 904 to move the tool electrode 101 to a predetermined depth or a predetermined position Further, the command value Upl to the electrode driving apparatus section 309 is determined in the planetary motion control section 903 on the basis of the deviation e and the planetary motion locus vector Rv, the tool electrode is moved in the expanded manner by the electrode driving section, and the planetary motion machining is achieved while maintaining the stable machining state. Further, the command value Ups to the position adjusting apparatus section 602 is determined in the machining control section 905 on the basis of the deviation e and the machining pass vector Rp, and is moved to the predetermined depth or the predetermined position while maintaining the stable machining state. At this time, the planetary motion control section 903 and the machining control section 905 are synchronized by the signal cv.

As mentioned above, in accordance with the electric discharge machining apparatus corresponding to the forth embodiment of the present invention, since there are provided the coordination machining control section 901 including the planetary motion control section 903 and the machining control section 905, the planetary motion locus setting section 902 and the machining pass setting section 904, it is possible to adjust the position of the tool electrode 101 on the basis of the machining pass vector Rp set in the machining pass setting section 904 by the position adjusting apparatus section 602, and it is possible to execute the planetary motion on the basis of the planetary motion locus vector Rv set in the planetary motion locus setting section 902 by the electrode driving apparatus section 309 capable of executing the high speed response. Accordingly, it is possible to achieve the planetary motion maintaining a stable machining state by the electrode driving apparatus section 309 capable of executing the high speed response, and it is possible to achieve an improvement of the machining speed and an improvement of the machining accuracy.

In the above, the structure is made such that the planetary motion control section 903 is provided in the coordination machining control section 901 and the planetary motion machining is executed by the electrode driving section, however, it may be made such that the planetary motion control section 903 and the jump motion control section 803 described in the third embodiment are simultaneously provided in the coordination machining control section 901, and the planetary motion machining is executed while executing the jump motion by the position adjusting section.

Fifth Embodiment

Figure 11:
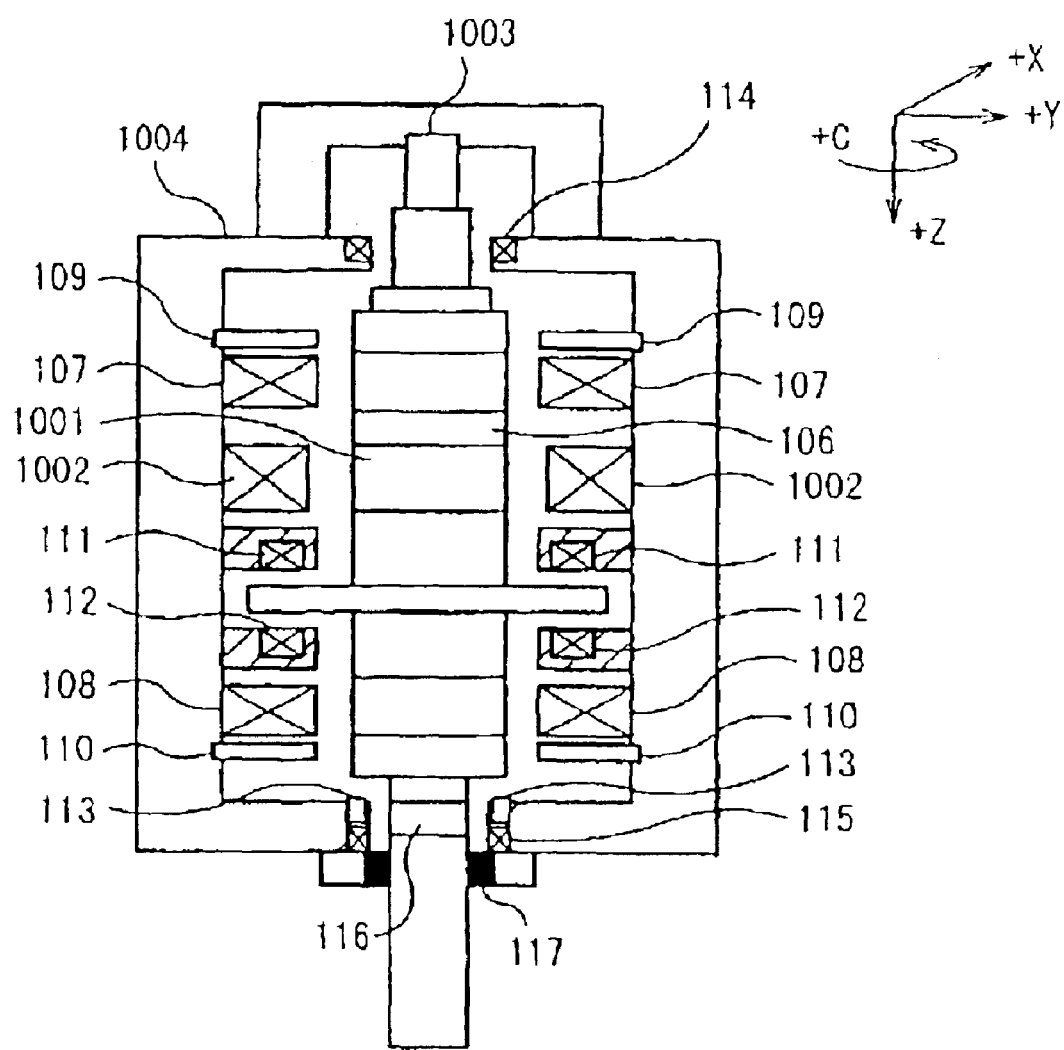
FIG. 11 is a schematic view which shows an electrode driving unit in an electric discharge machining apparatus corresponding to a fifth embodiment of the present invention.

FIG. 11 is an outline schematic view which shows an electrode driving section in an electric discharge machining apparatus corresponding to a fifth embodiment of the present invention. In FIG. 11, reference numerals 106 to 117 are the same as those shown in the first embodiment. Reference numeral 1001 denotes a motor section which rotates the electrode mounting section 106, reference numeral 1002 denotes an electromagnetic section which applies a torque to the motor section 1001, reference numeral 1003 denotes a rotation detecting section which detects at least one or both of an angle of rotation and an angular velocity of rotation of the electrode mounting section 106, and reference numeral 1004 denotes an electrode driving section. As mentioned above, a rotation driving section is constituted by the motor section 1001 and the electromagnet section 1002.

Figure 12:
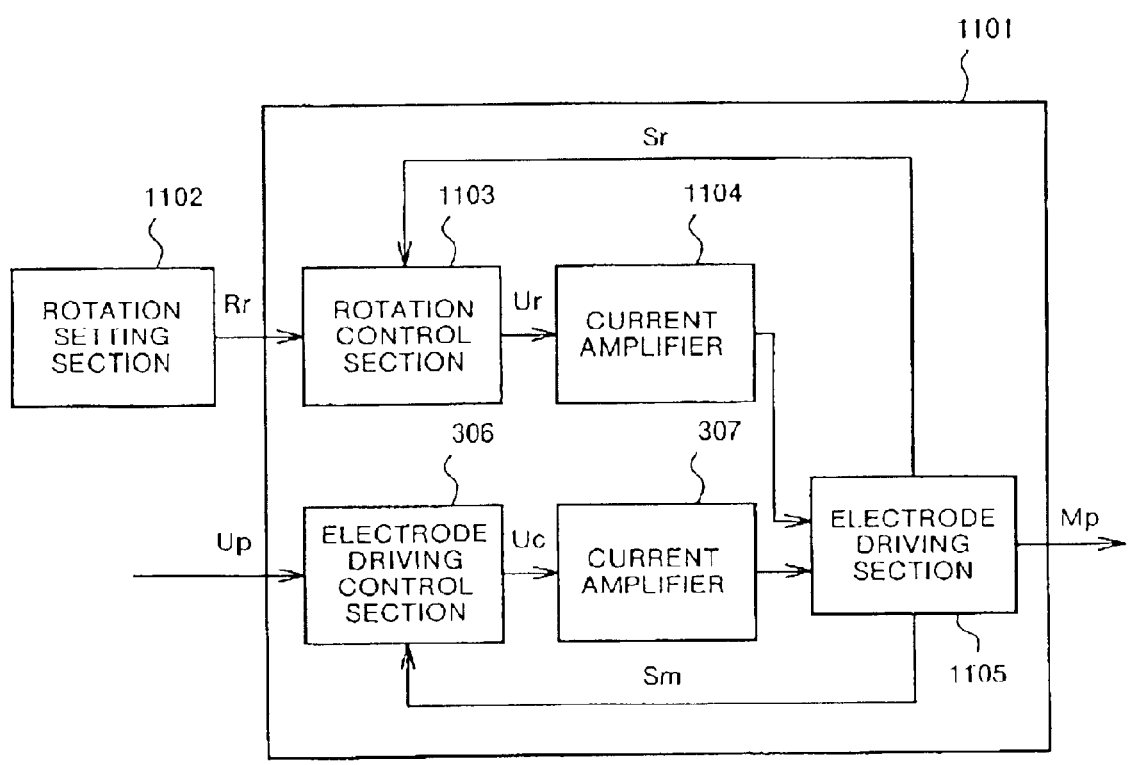
FIG. 12 is a flow chart which shows a part of a system for controlling a gap between tool electrode and a workpiece in the electric discharge machining apparatus having the electrode driving unit shown in FIG. 11.

FIG. 12 is a block diagram of a part of a gap control system in the electric discharge machining apparatus having the electrode driving section shown in FIG. 11, that is, an electrode driving apparatus section which is different from the electrode driving apparatus section 309 shown in FIG. 3 of the first embodiment. In FIG. 12, meanings of e, Up, Mp, 306, 307, Uc and Sm are the same as those shown in the first embodiment. Reference numeral 1101 denotes an electrode driving apparatus section, reference numeral 1102 denotes a rotation setting section, reference numeral 1103 denotes a rotation control section, and reference numeral 1104 denotes a current amplifier. Reference numeral 1105 corresponds to the electrode driving section 1004 in FIG. 11. In FIG. 12, Rr corresponds to a rotation set value of at least one or both of the angle of rotation and the angular velocity of rotation, Sr corresponds to a detected value detected by the rotation detecting section 1003, and Ur corresponds to a command value to the current amplifier.

Here, it is assumed that the angle of rotation Rr of the tool electrode 101 is set by the rotation setting section 1102. The rotation control section 1103 determines the command value Ur to the current amplifier 1104 so that the detected value Sr detected in the rotation detecting section 1003 coincides with the set value Rr, and rotates the tool electrode 101 at only a predetermined angle. Further, when the angular velocity of rotation Rr of the tool electrode 101 is set by the rotation setting section 1102, the rotation control section 1103 determines the command value Ur to the current amplifier 1104 so that the detected value Sr detected in the rotation detecting section 1003 coincides with the set value Rr, and controls the angular velocity of rotation of the tool electrode 101.

As mentioned above, in accordance with the electric discharge machining apparatus corresponding to the fifth embodiment of the present invention, since there are provided the electrode driving section 1004 constituted by the motor section 1001 which rotates the electrode mounting section 106, the electromagnet section 1002 which applies the torque to the motor section 1001, and the rotation detecting section 1003 which detects at least one or both of the angle of rotation and the angular velocity of rotation of the electrode mounting section 106, and the electrode driving apparatus section 1101 constituted by the rotation setting section 1102, the rotation control section 1103 and the current amplifier 1104, in addition to the structures of the electrode driving section 105 and the electrode driving apparatus section 309 in the electric discharge machining apparatus corresponding to the first embodiment, it is possible to rotate the tool electrode 101 at a predetermined angle on the basis of the angle of rotation Rr set by the rotation setting section 1102, or it is possible to control the angular velocity of rotation of the tool electrode 101 on the basis of the angular velocity of rotation Rr set by the rotation setting section 1102. Accordingly, it is possible to identify the rotational position of the tool electrode 101, to achieve the machining while rotating the tool electrode 101 and to maintain a stable machining state with the electrode driving apparatus section 1101 which can respond at high speed. As a result, it is possible to achieve an improvement of machining speed and an improvement of machining accuracy.

The electrode driving apparatus section 1101 mentioned above may construct the electric discharge machining apparatus in place of the electrode driving apparatus section in the electric discharge machining apparatus corresponding to the second, third, and fourth embodiments.

Sixth Embodiment

Figure 13:
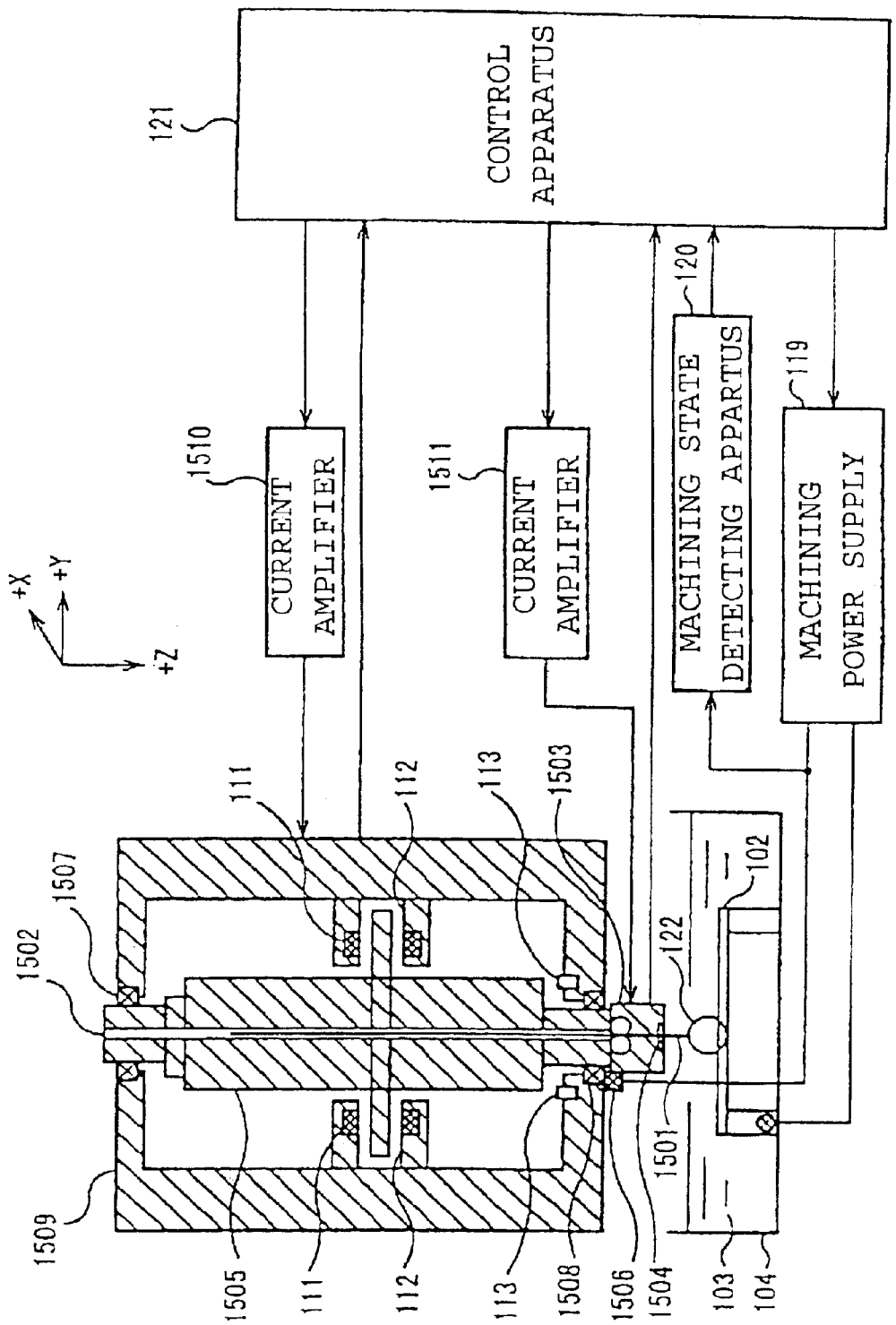
FIG. 13 is a schematic view which shows an outline of an electric discharge machining apparatus corresponding to a sixth embodiment of the present invention.

FIG. 13 is a schematic view which shows an outline of an electric discharge machining apparatus corresponding to a sixth embodiment of the present invention. In FIG. 13, reference numerals 102 to 104 are the same as those shown in the conventional art. Further, reference numerals 111 to 113 and 119 to 122 are the same as those shown in the first embodiment. Further, reference numeral 1501 denotes a wire-like electrode, reference numeral 1502 denotes a through hole section which inserts the wire-like electrode 1501 therethrough, reference numeral 1503 denotes an electrode holding/feeding section which holds or feeds the wire-like electrode 1501, reference numeral 1504 denotes an electrode guide which guides the wire-like electrode 1501, reference numeral 1505 denotes an electrode mounting section having the electrode holding/feeding section 1503 at a front end and having the through hole section 1502 at a center, reference numeral 1506 denotes a power supply section which supplies a machining energy from the machining power supply 119, reference numerals 1507 and 1508 denote a bearing section which supports the electrode mounting section 1505 in XY surface, reference numeral 1509 denotes an electrode driving section constituted by the electrode holding/feeding section 1503 and the thrust electromagnet sections 111 and 112, reference numeral 1510 denotes a current amplifier which supplies current to the electromagnet sections 111 and 112 of the electrode driving section 1509, and reference numeral 1511 denotes a current amplifier which supplies current to the electrode holding/feeding section 1503.

Figure 14:
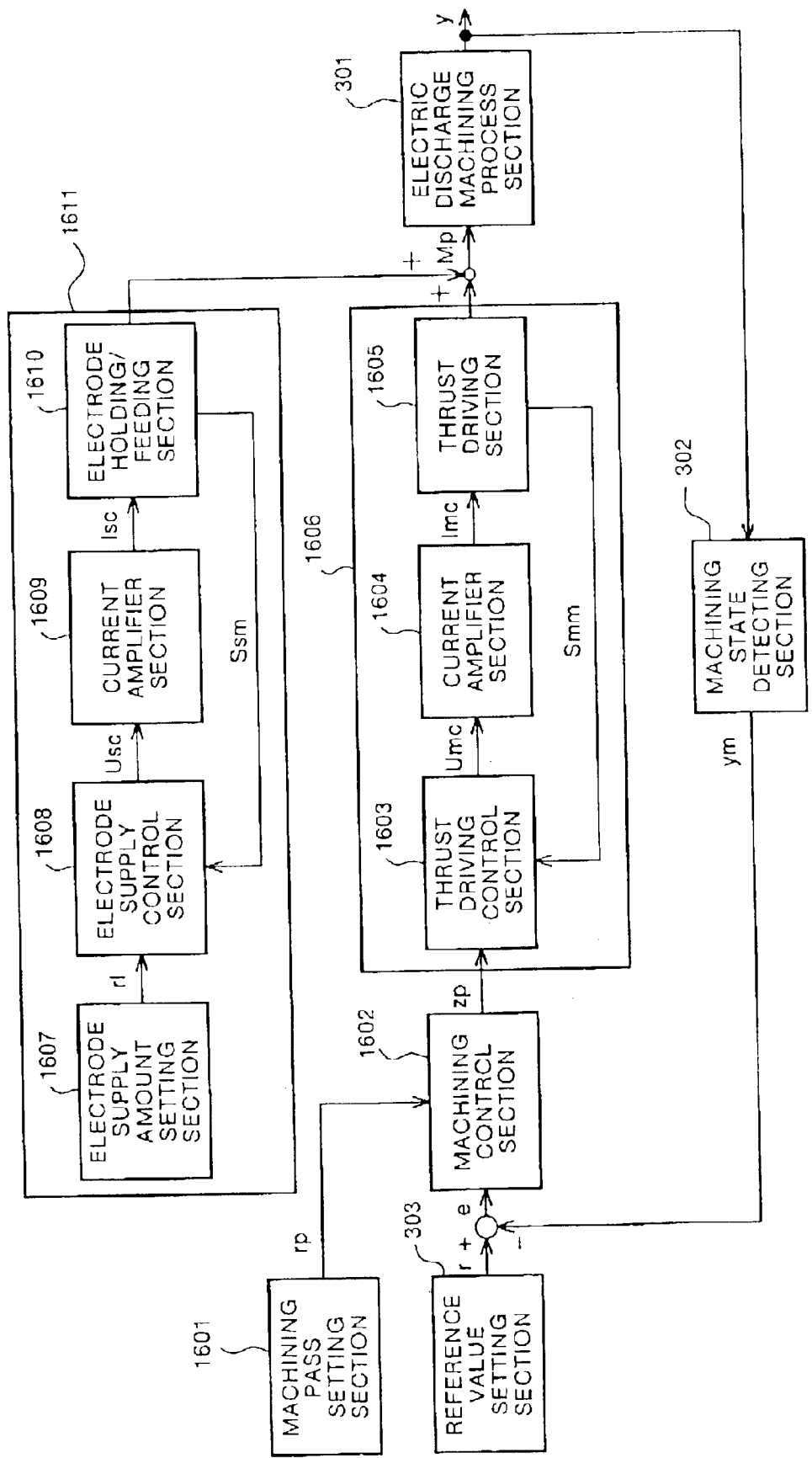
FIG. 14 is a block diagram of a gap control system which controls machining state in the electric discharge machining apparatus shown in FIG. 13, and an electrode supply control system.

The electric discharge machining apparatus shown in FIG. 13 can continuously and effectively execute a hole machining by using the wire-like electrode 1501. That is, at first, the wire-like electrode 1501 is supplied to the through hole section 1502. The wire-like electrode 1501 is fed by the electrode holding/feeding section 1503, and the electrode is held in a state such that the tip of the electrode is fed out from the electrode guide 1504 for a predetermined amount. In this state, machining power is supplied to the wire-like electrode 1501 and the workpiece 102 by the machining power supply 119, and the machining is executed while the controlling the gap between the tool electrode and the workpiece with the help of the machining state detecting apparatus 120, the electrode driving section 1509, and the control apparatus 121. In the electric discharge machining, the wire-like electrode 1501 is consumed every one hole machining, and a length of the electrode protruding out from the electrode guide 1504 is reduced. Accordingly, when the length of the electrode protruding out from the electrode guide 1504 is insufficient to execute the next hole machining, the wire-like electrode 1501 is again fed by the electrode holding/feeding section 1503, the electrode is held in a state of feeding out the leading end of the electrode from the electrode guide 1504 at a predetermined amount, and the next hole machining is executed. FIG. 14 is a block diagram of a gap control system which controls the electric discharge machining state in the electric discharge machining apparatus shown in FIG. 13, and an electrode supply control system.

In FIG. 14, the same reference numerals as those in FIG. 3 denote the same or corresponding elements, and a description thereof will be omitted. Reference numeral 1601 denotes a machining pass setting section, reference numeral 1602 denotes a machining control section, reference numeral 1603 denotes a thrust driving control section, reference numeral 1604 denotes a current amplifier section, reference numeral 1605 denotes a thrust driving section, reference numeral 1606 denotes a thrust driving apparatus section constituted by the thrust driving control section 1603 and the current amplifier section 1604 and the thrust driving section 1605, reference numeral 1607 denotes an electrode supply amount setting section, reference numeral 1608 denotes an electrode supply control section, reference numeral 1609 denotes a current amplifier section, reference numeral 1610 denotes an electrode holding/feeding section, and reference numeral 1611 denotes an electrode holding/feeding apparatus section constituted by the electrode supply amount setting section 1607, the electrode supply control section 1608, the current amplifier section 1609 and the electrode holding/feeding section 1610. The current amplifier section 1604 corresponds to the current amplifier 1510, the thrust driving section 1605 corresponds to the electrode driving section 1509 excluding the electrode holding/feeding section 1503, the current amplifier section 1609 corresponds to the current amplifier 1511, and the electrode holding/feeding section 1610 corresponds to the electrode holding/feeding section 1503, respectively. Further, the reference value setting section 303, the machining pass setting section 1601, the machining control section 1602, the thrust driving control section 1603, the electrode supply amount setting section 1607 and the electrode supply control section 1608 are constructed in the control apparatus 121. Further, rp indicates a machining depth set in the machining pass setting section 1601, zp indicates a position command value to the thrust driving control section 1603, Umc indicates a current command value to the current amplifier section 1604, Imc indicates a current amount supplied to the thrust driving section 1605, Smm indicates a position detected value obtained from the thrust driving section 1606, rl indicates an electrode supply amount set in the electrode supply amount setting section 1607, Usc indicates a current command value to the current amplifier section 1609, Isc indicates a current amount supplied to the electrode holding/feeding section 1610, Ssm indicates a position detected value obtained from the electrode holding/feeding section 1610, and Mp indicates an electrode position operating amount operated by the thrust driving section 1605 and the electrode holding/feeding section 1610.

The position command value zp to the thrust driving control section 1603 in the thrust driving apparatus section 1606 is determined in the machining control section 1602 on the basis of the deviation c and the machining pass rp. Since machining depth of the machining pass rp is given by the Cartesian coordinate system (XYZ), the position command value zp is in the same Cartesian coordinate system (XYZ). Further, the position detected value Smm corresponds to a detected value in the thrust direction (z direction). Further, in the thrust driving section 1605, the tool electrode is driven by two thrust electromagnets as shown in FIG. 13. Accordingly, in the thrust driving control section 1603, the current command value Umc to the current amplifier section 1604 is determined by comparing the position command value zp with the position detected value Smm. The current command value Ume is given to two current amplifiers for the thrust electromagnet sections 111 and 112.

On the contrary, the current command value Usc to the current amplifier section 1609 in the electrode holding/feeding apparatus section 1611 is determined in correspondence to the state of holding or feeding the electrode while referring to the electrode supply amount rl obtained from the electrode supply amount setting section 1607 by the electrode supply control section 1608 and the position detected value Ssm obtained from the electrode holding/feeding section 1610, and the current amount Isc is supplied to the electrode holding/feeding section 1610 in correspondence to the command value.

Figure 15:
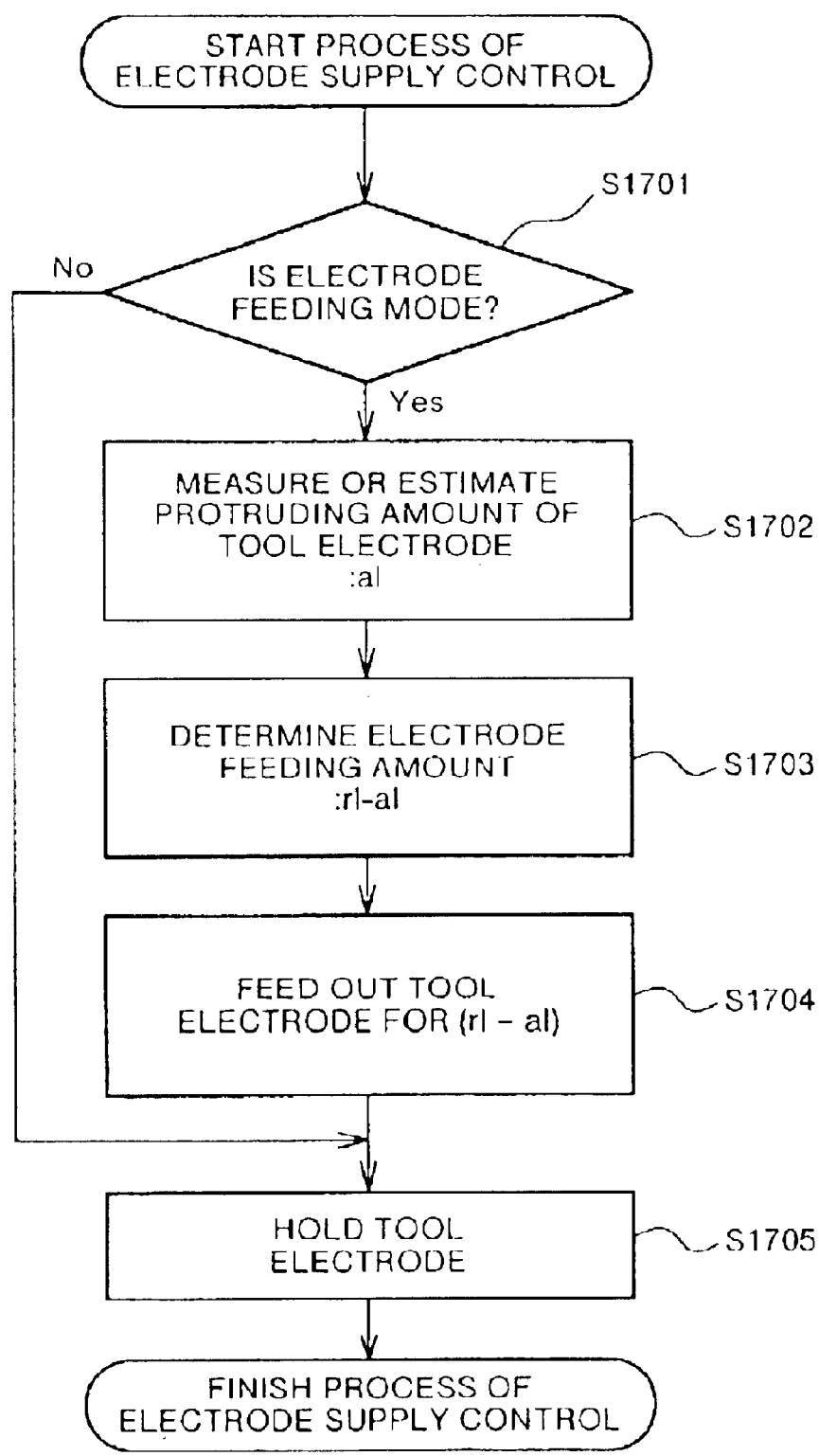
FIG. 15 is a flow chart which shows an operation content in the electrode supply control system shown in FIG. 14.

FIG. 15 is a flow chart which shows an operation content of the electrode supply control system shown in FIG. 14. The electrode supply control system is generally achieved by a software process applied by a microcomputer. Since the operation content of the gap control system shown in FIG. 14 is the same as the control in the thrust direction in the first embodiment, a description thereof will be omitted. In FIG. 15, in step S1701, it is determined whether it is in the electrode feeding mode or the electrode holding mode at present. When it is in the electrode holding mode, in step S1705, the state of holding the tool electrode is maintained. When it is in the electrode feeding mode, it is measured or estimated in step S1702 how long the tip of the tool electrode protrudes out from the electrode guide 1504. This quantity may be measured, for example, by using the following process. For example, the tip of the electrode by the thrust driving apparatus section 1606 is driven until it is in contact with a certain reference position, and since the initial position and the final position are known, it is possible to determine the quantity. Further, this quantity may be estimating, for example, by using the following process. For example, amount of consumption of an electrode may be measured beforehand for different machining condition, and by subtracting the consumption amount for the current machining condition from the electrode supply amount rl it is possible to determine the quantity. In step S1703, an amount to be actually fed out is determined on the basis of a value al obtained in step S1702 and the electrode supply amount rl, and in step S1704, the tool electrode is fed out by the electrode holding/feeding section 1610 at a determined amount. Further, in step S1705, the tool electrode is held.

As mentioned above, in the electric discharge machining apparatus corresponding to the sixth embodiment of this invention, in accordance with the electrode driving section 1509, since the structure is made such as to drive the electrode holding/feeding section 1503 which holds the wire-like electrode 1501 and the electrode mounting section 1505 in a non-contact manner in the thrust direction by the thrust electromagnet section 111 and the thrust electromagnetic section 112, it is possible to restrict a mass increase of the section which should be driven together with the wire-like electrode 1501. Then, it is possible to achieve a high response in the thrust direction, and it is possible to always maintain a stable machining state even when the machining state irregularly changes. Accordingly, it is possible to achieve an improvement of machining speed, and further an improvement of machining accuracy. Further, in accordance with the electrode holding/feeding section 1503, since it is possible to automatically hold or feed the wire-like electrode 1501, it is possible to continuously and effectively execute the hole machining.

Figure 16:
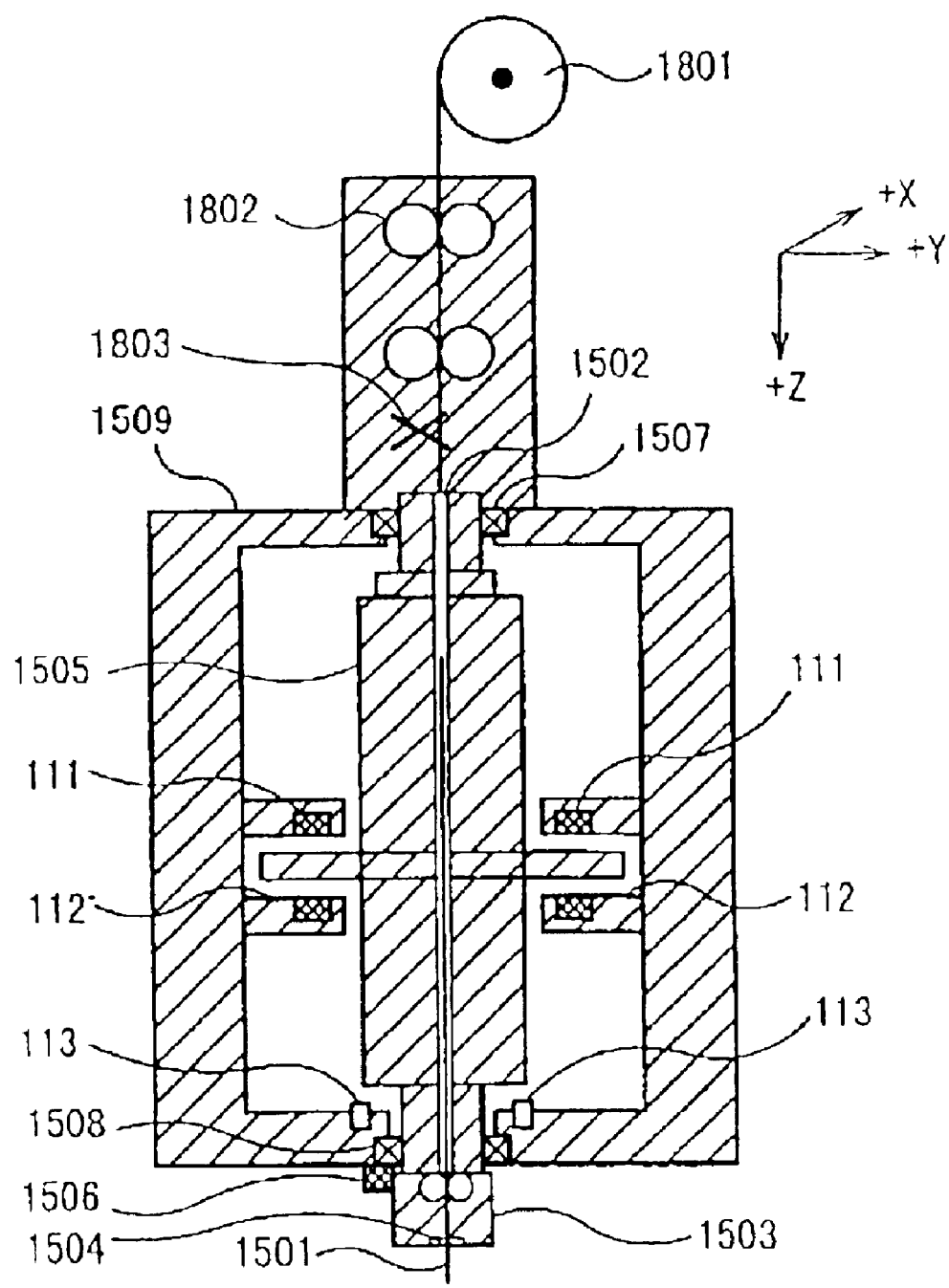
FIG. 16 is a schematic view which shows an outline of a characteristic section of another electric discharge machining apparatus corresponding to the sixth embodiment of the present invention.
Figure 17:
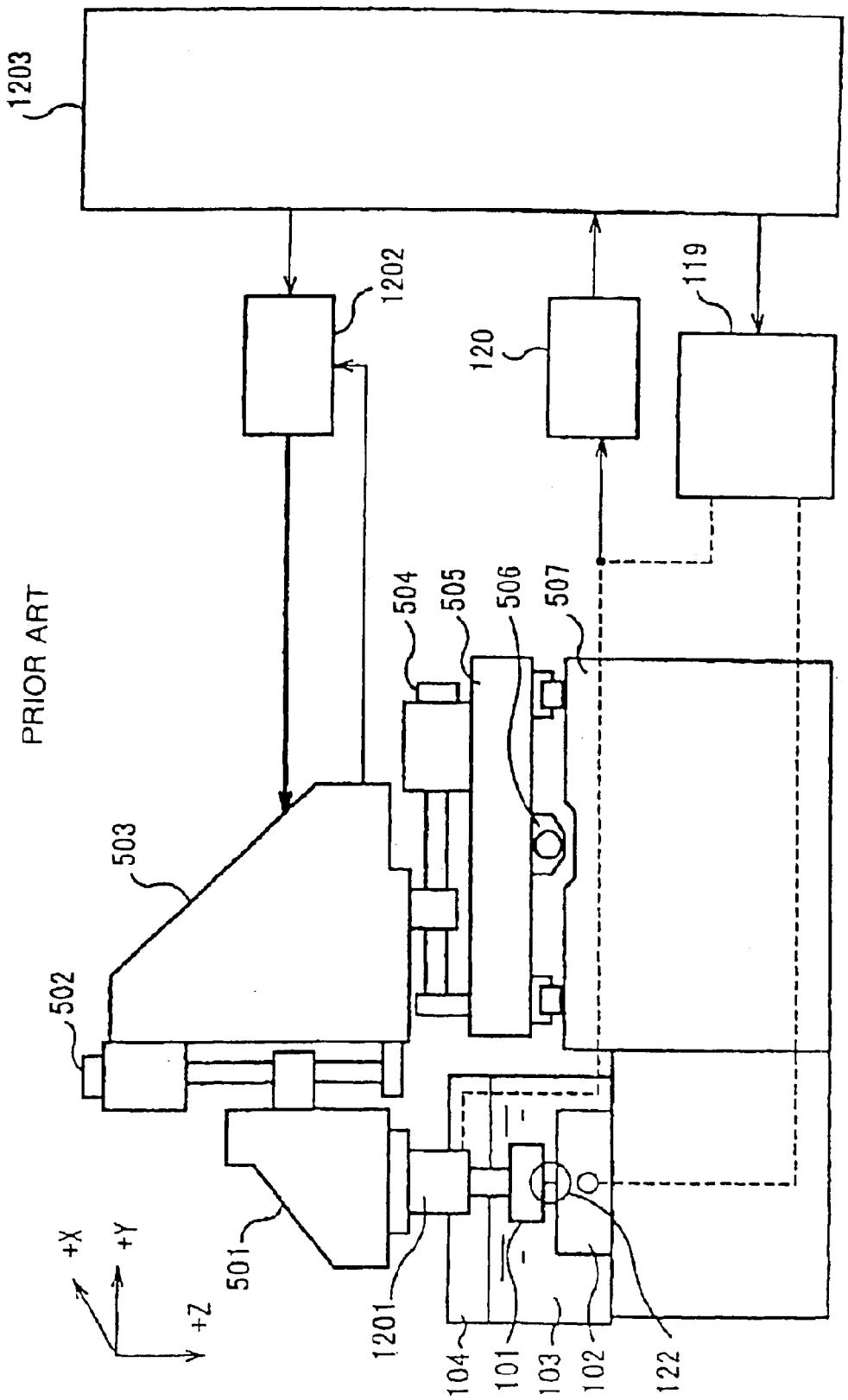
FIG. 17 is a schematic view which shows a conventional electric discharge machining apparatus.
Figure 18:
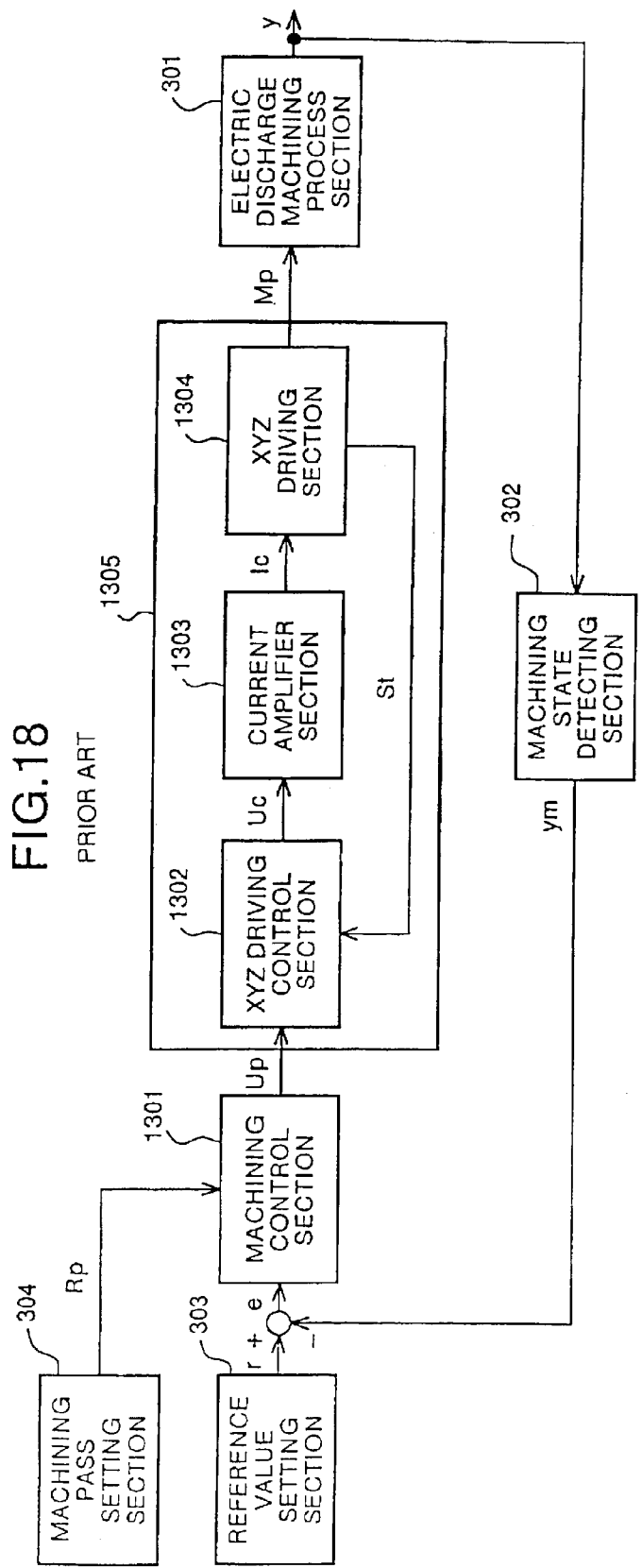
FIG. 18 is a block diagram which shows a system for controlling a gap between tool electrode and a workpiece in the electric discharge machining apparatus shown in FIG. 17.

FIG. 16 is a schematic view which shows an outline of a characteristic section in another electric discharge machining apparatus corresponding to the sixth embodiment of the present invention. In FIG. 16, reference numeral 1801 denotes a bobbin around which the wire-like electrode 1501 is wound, reference numeral 1802 denotes a tool electrode supply section which feeds out the wire-like electrode 1501, and reference numeral 1803 denotes an electrode cutting section which cuts the wire-like electrode 1501 at a suitable length. When the machining is continuously executed and the wire-like electrode 1501 is consumed so as to be short, the wire-like electrode 1501 is automatically inserted to the through hole section 1502 from the bobbin 1801 by the tool electrode supply section, and is cut by the electrode cutting section 1803 after being fed out at a predetermined length. Then, the electrode is held in a state in which the electrode is fed out at the predetermined length from the electrode guide 1504 by the electrode holding/feeding section 1503 to prepare for the next machining.

As mentioned above, in accordance with another electric discharge machining apparatus corresponding to the sixth embodiment of this invention, it is possible to automatically supply the tool electrode by the bobbin 1801 around which the wire-like electrode is wound, the tool electrode supply section 1802, and the electrode cutting section 1803, it is possible to automatically replace the electrode at a time when the tool electrode is consumed, and it is possible to automatically execute the continuous hole machining.

In the above, the structure is made such as to drive the wire-like electrode 1501 in a non-contact manner in the thrust direction by the electrode driving section 1509, however, it is possible to combine with the position adjusting section capable of adjusting the position of the electrode driving section 1509 in the X-axis direction, the Y-axis direction and the Z-axis direction like the electric discharge machining apparatus corresponding to the second embodiment where it is possible to obtain the same effects as mentioned above and it is possible to expand a substantial driving stroke.

Further, in the above, the structure is made such as to drive the wire-like electrode 1501 in a non-contact manner in the thrust direction by the electrode driving section 1509, however, a rotation driving section which rotates the electrode mounting section 1505 like the electric discharge machining apparatus corresponding to the fifth embodiment may be provided where it is possible to obtain the same effect as mentioned above, and it is possible to achieve a more stable machining by executing the machining while rotating the electrode when the hole machining is employed.

INDUSTRIAL APPLICABILITY

The present invention is applied to the electric discharge machining apparatus, restricts the mass increase of the section which should be driven together with the tool electrode, and achieves the high speed response in the X-axis, the Y-axis and the Z-axis, whereby it is possible to improve the machining speed and the machining accuracy and it can be effectively utilized for the hole machining.

What is claimed is:

1. An electric discharge machining apparatus comprising:
   an electrode mounting unit which holds a tool electrode;
   an electrode driving unit including a radial driving unit which drives the electrode mounting unit in a non-contact manner in a radial direction and a thrust driving unit which drives the electrode mounting unit in a non-contact manner in a thrust directions wherein the electrode mounting unit includes an insulation section situated between i) a part of the electrode mounting unit where the tool electrode is mounted and where machining energy is supplied, and ii) a part of the electrode mounting unit that faces one of the radial driving unit and the thrust driving unit;
   a machining state detecting unit which detects an electric discharge machining state to obtain a detected value;
   a reference value setting unit which sets a reference value to control the electric discharge machining state;
   a machining pass setting unit which sets a machining pass; and
   a machining control unit which adjusts position of the tool electrode by the electrode driving unit based on the machining pass set by the machining pass setting unit, so that the state detected by the machining state detecting unit coincides with the reference value set by the reference value setting unit.

2. An electric discharge machining apparatus comprising:
   an electrode mounting unit which holds a tool electrode;
   an electrode driving unit having a radial driving unit which drives the electrode mounting unit in a non-contact manner in a radial direction and a thrust driving unit which drives the electrode mounting unit in a non-contact manner in a thrust direction;
   a position adjusting unit which adjusts position of the electrode driving unit or of a workpiece;
   a machining state detecting unit which detects an electric discharge machining state to obtain a detected value;
   a reference value setting unit which sets a reference value to control the electric discharge machining state;
   a machining pass setting unit which sets a machining pass; and
   a coordinating machining control unit which adjusts relative positions of the tool electrode and the workpiece by coordinating the electrode driving unit with the position adjusting unit, while taking into consideration the machining pass set by the machining pass setting unit, so that the state detected by the machining state detecting unit coincides with the reference value set by the reference value setting unit.

3. The electric discharge machining apparatus according to claim 2, wherein the coordinating machining control unit has a jump motion control unit which controls jump motion of the position adjusting unit.

4. The electric discharge machining apparatus according to claim 2, wherein the coordinating machining control unit has a planetary motion control unit which controls planetary motion of the electrode driving unit.

5. The electric discharge machining apparatus according to claim 2, wherein the coordinating machining control unit has a jump motion control unit which controls jump motion of the position adjusting unit and a planetary motion control unit which controls planetary motion of the electrode driving unit.

6. The electric discharge machining apparatus according to claim 2, wherein the electrode driving unit has a rotation driving unit which rotates the electrode mounting unit and a rotation detecting unit which detects at least one of an angle of rotation and an angular velocity of rotation, and one of the machining control unit and the coordinating machining control unit has a rotation control unit.

7. An electric discharge machining method comprising:
   driving an electrode mounting unit which holds a tool electrode in a non-contact manner in a radial direction and driving the electrode mounting unit in a non-contact manner in a thrust direction;
   electrically insulating a part of the electrode mounting unit that faces one of a radial driving unit and a thrust driving unit to prevent machining current from flowing into the part; and
   adjusting position of the tool electrode with respect to the workpiece while taking into consideration a set machining pass, so that a detected value of an electric discharge machining state coincides with a set reference value of the electric discharge machining state.

8. An electric discharge machining method comprising:
driving an electrode mounting unit which holds a tool electrode in a non-contact manner in a radial direction and driving the electrode mounting unit in a non-contact manner in a thrust direction;
electrically insulating a part of the electrode mounting unit that faces one of a radial driving unit and a thrust driving unit to prevent machining current from flowing into the part;
adjusting position of a driving unit or a workpiece; and
adjusting position of the tool electrode with respect to the workpiece while taking into consideration a set machining pass, so that a detected value of an electric discharge machining state coincides with a set reference value of the electric discharge machining state by coordinating the driving unit with the adjusting unit.

9. An electric discharge machining apparatus comprising:
an electrode mounting unit having a through hole for inserting a wire electrode therethrough and which has a holding and feeding mechanism for the electrode;
an electrode driving unit having a thrust driving unit which drives the electrode mounting unit at least in a non-contact manner in a thrust direction;
a machining state detecting unit which detects an electric discharge machining state as a detected value;
a reference value setting unit which sets a reference value to control the electric discharge machining state;
a machining control unit which adjusts a position of the wire electrode by controlling the electrode driving unit so that the state detected by the machining state detecting unit coincides with the reference value set by the reference value setting unit; and
an electrode supply control unit which adjusts holding and feeding of the electrode.

10. The electric discharge machining apparatus according to claim 9, comprising a wire electrode automatic supplying unit which automatically supplies the wire electrode to the through hole provided in the electrode driving unit.

11. The electric discharge machining apparatus according to claim 9, wherein the electrode driving unit has a rotation driving unit which rotates the electrode mounting unit.

12. The electric discharge machining apparatus according to claim 10, wherein the electrode driving unit has a rotation driving unit which rotates the electrode mounting unit.

13. The electric discharge machining apparatus according to claim 1, where the electrode driving unit includes a rotation driving unit which rotates the electrode mounting unit and a rotation detecting unit which detects at least one of an angle of rotation and an angular velocity of rotation.

14. An electric discharge machining apparatus comprising:
an electrode mounting unit having a through hole for inserting a wire electrode therethrough and having a holding mechanism for holding the wire electrode;
an electrode driving unit having a thrust driving unit which drives the electrode mounting unit in a non-contact manner at least in a thrust direction;
a machining state detecting unit which detects an electric discharge machining state as a detected value;
a reference value setting unit which sets a reference value to control the electric machining state; and
a machining control unit which adjusts position of the wire electrode by controlling the electrode driving unit so that the state detected by the machining state detecting unit coincides with the reference value set by the reference value setting unit.

15. The electric discharge machining apparatus according to claim 14, further comprising a wire electrode automatic supply unit which automatically supplies the wire electrode to the through hole in the electrode driving unit.

16. The electric discharge machining apparatus according to claim 14, wherein the electrode driving unit has a rotation driving unit which rotates the electrode mounting unit.

17. The electric discharge machining apparatus according to claim 15, wherein the electrode driving unit has a rotation driving unit which rotates the electrode mounting unit.

18. An electric discharge machining apparatus comprising:
an electrode mounting unit having a through hole for inserting a wire electrode therethrough and having a holding mechanism for holding the wire electrode;
an electrode driving unit having a thrust driving unit which drives the electrode mounting unit in a non-contact manner at least in a thrust direction;
a bearing unit which supports the electrode mounting unit in an X-Y plane;
a machining state detecting unit which detects an electric discharge machining state as a detected value;
a reference value setting unit which sets a reference value to control the electric machining state; and
a machining control unit which adjusts position of the wire electrode by controlling the electrode driving unit so that the state detected by the machining state detecting unit coincides with the reference value set by the reference value setting unit.

19. The electric discharge machining apparatus according to claim 18, further comprising a wire electrode automatic supply unit which automatically supplies the wire electrode to the through hole in the electrode driving unit.

20. The electric discharge machining apparatus according to claim 18, wherein the electrode driving unit has a rotation driving unit which rotates the electrode mounting unit.

21. The electric discharge machining apparatus according to claim 19, wherein the electrode driving unit has a rotation driving unit which rotates the electrode mounting unit.

* * * * *